United States Patent
Ballard et al.

(10) Patent No.: US 10,293,259 B2
(45) Date of Patent: May 21, 2019

(54) CONTROL OF AUDIO EFFECTS USING VOLUMETRIC DATA

(71) Applicant: Microsoft Technology Licensing, LLC, Redmond, WA (US)

(72) Inventors: Jeffrey Ryan Ballard, Carnation, WA (US); Robert L. Ridihalgh, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/402,091

(22) Filed: Jan. 9, 2017

(65) Prior Publication Data

US 2017/0165576 A1 Jun. 15, 2017

Related U.S. Application Data

(63) Continuation-in-part of application No. 14/964,390, filed on Dec. 9, 2015.

(51) Int. Cl.
*A63F 13/54* (2014.01)
*A63F 13/57* (2014.01)

(52) U.S. Cl.
CPC .............. *A63F 13/54* (2014.09); *A63F 13/57* (2014.09)

(58) Field of Classification Search
CPC .......... G06F 3/165; A63F 13/54; A63F 13/57; H04S 7/303; H04S 2400/11
USPC ........................................................ 700/94
See application file for complete search history.

(56) References Cited

U.S. PATENT DOCUMENTS

| | | |
|---|---|---|
| 5,315,512 A | 5/1994 | Roth |
| 5,995,447 A | 11/1999 | Mandal et al. |
| 6,917,686 B2 | 7/2005 | Jot et al. |
| 8,525,834 B2 | 9/2013 | Salemann |
| 8,587,583 B2 | 11/2013 | Newcombe et al. |
| 8,767,968 B2 | 7/2014 | Flaks et al. |
| 9,202,509 B2 | 12/2015 | Kallai et al. |
| 2003/0107478 A1 | 6/2003 | Hendricks et al. |
| 2006/0153391 A1 | 7/2006 | Hooley et al. |
| 2007/0121955 A1 | 5/2007 | Johnston et al. |
| 2008/0183077 A1 | 7/2008 | Moreau-Gobard et al. |

(Continued)

FOREIGN PATENT DOCUMENTS

| | | |
|---|---|---|
| CN | 102665156 A | 9/2012 |
| EP | 2552130 A1 | 1/2013 |

(Continued)

OTHER PUBLICATIONS

Song, et al., "Enhancing Loudspeaker-based 3D Audio with Room Modeling", In Proceedings of IEEE International Workshop on Multimedia Signal Processing, Oct. 4, 2010, 6 pages.

(Continued)

*Primary Examiner* — Andrew C Flanders
(74) *Attorney, Agent, or Firm* — Alleman Hall Creasman & Tuttle LLP

(57) ABSTRACT

One example method for processing sound in a computer environment includes recognizing a location of a listener in the computer environment, identifying a shape matrix including, for each of a plurality of vectors intersecting the location of the listener, a distance from the location of the listener to an environmental boundary of the computer environment along the vector, selecting an audio filter based on the shape matrix, and outputting sound filtered by the audio filter.

19 Claims, 18 Drawing Sheets

(56) References Cited

U.S. PATENT DOCUMENTS

| | | | |
|---|---|---|---|
| 2008/0205667 | A1 | 8/2008 | Bharitkar et al. |
| 2008/0232602 | A1 | 9/2008 | Shearer |
| 2010/0020951 | A1 | 1/2010 | Basart et al. |
| 2010/0156901 | A1 | 6/2010 | Park et al. |
| 2011/0081023 | A1 | 4/2011 | Raghuvanshi et al. |
| 2011/0149680 | A1 | 6/2011 | Oishi |
| 2011/0254842 | A1 | 10/2011 | Dmitrieva et al. |
| 2011/0317522 | A1 | 12/2011 | Florencio et al. |
| 2012/0014551 | A1 | 1/2012 | Ohashi et al. |
| 2012/0093320 | A1 | 4/2012 | Flaks et al. |
| 2012/0113224 | A1 | 5/2012 | Nguyen et al. |
| 2012/0179041 | A1 | 7/2012 | Nakagawa |
| 2012/0213375 | A1 | 8/2012 | Mahabub et al. |
| 2012/0215530 | A1 | 8/2012 | Harsch |
| 2012/0288124 | A1 | 11/2012 | Fejzo et al. |
| 2013/0170647 | A1 | 7/2013 | Reilly et al. |
| 2013/0249914 | A1 | 9/2013 | Ignatoff |
| 2014/0342823 | A1 | 11/2014 | Kapulkin et al. |
| 2015/0016642 | A1 | 1/2015 | Walsh et al. |
| 2015/0063572 | A1 | 3/2015 | Gleim |
| 2015/0139439 | A1 | 5/2015 | Norris et al. |
| 2015/0378019 | A1 | 12/2015 | Schissler et al. |
| 2015/0382128 | A1 | 12/2015 | Ridihalgh et al. |
| 2016/0196108 | A1 | 7/2016 | Selig et al. |

FOREIGN PATENT DOCUMENTS

| | | |
|---|---|---|
| SE | 470579 B | 9/1994 |
| WO | 2014146668 A2 | 9/2014 |

OTHER PUBLICATIONS

Griesinger, David, "Loudspeaker and listener positions for optimal low-frequency spatial reproduction in listening rooms", In Journal of the Acoustical Society of America, vol. 117, Issue 4, Apr. 2005, pp. 1-21.

IPEA European Patent Office, Second Written Opinion Issued in PCT Application No. PCT/US2016/062986, dated Jun. 20, 2017, WIPO, 4 pages.

Röber, N. et al., "Ray Acoustics Using Computer Graphics Technology", In Proceedings of the 10th International Conference on Digital Audio Effects (DAFx-07), Sep. 10, 2007, Bordeaux, France, 8 pages.

Taylor, M. et al., "Interactive Geometric Sound Propagation and Rendering", Available at https://software.intel.com/sites/default/files/m/d/4/1/d/8/InteractiveGeometricSoundPropagationandRendering.pdf, Jun. 24, 2010, 16 pages.

Zimmermann, B. et al., "FPGA-based Real-Time Acoustic Camera Prototype", In Proceedings of the International Symposium on Circuits and Systems, May 30, 2010, Paris, France, 4 pages.

Huang, P. et al., "Spread: Sound Propagation and Perception for Autonomous Agents in Dynamic Environments," In Proceedings of the 12th ACM Siggraph/Eurographics Symposium on Computer Animation (SCA '13), Jul. 19, 2013, Anaheim, California, 11 pages.

Filion, D., "Potentially Audible Sets", Chapter 6.4 in: Game Programming Gems 6, Mar. 7, 2006, 13 pages.

Raghuvanshi, N. et al., "Efficient and Accurate Sound Propagation Using Adaptive Rectangular Decomposition", in IEEE Transactions on Visualization and Computer Graphics, vol. 15, Issue 5, Sep. 2009, Paper first published online Feb. 4, 2009, 13 pages.

Haumont, D. et al., "Volumetric cell-and-portal generation", In Computer Graphics Forum, EUROGRAPHICS 2003 Conference Proceedings, vol. 22, No. 3, Sep. 1, 2003, 10 pages.

Upson, C. et al., "V-BUFFER: Visible Volume Rendering," Computer Graphics, ACM, vol. 22, No. 4, Proceedings of SIGGRAPH '88, Aug. 1, 1988, Atlanta, 6 pages.

ISA European Patent Office, International Search Report and Written Opinion issue in PCT Application No. PCT/US2016/062986, dated Feb. 28, 2017, WIPO, 13 pages.

Ondet, A. et al., "Modeling of sound propagation in fitted workshops using ray tracing", In Journal of Acoustical Society of America, vol. 85, Issue 2, Accepted for publication Sep. 29, 1988, Published online Jun. 1998, 11 pages.

Non-Final Office Action Issued in U.S. Appl. No. 14/964,390, dated Aug. 10, 2017, 18 Pages.

Soderberg, Martin, "Enhancing the Audio Environment in Virtual City Scenes", In Master Thesis, D-Level, Malardalen University, Sweden, Jun. 11, 2008, pp. 1-30.

"Notice of Allowance Issued in U.S. Appl. No. 14/964,390", dated Feb. 1, 2018, 2 Pages.

"Notice of Allowance Issued in U.S. Appl. No. 14/964,390", dated Dec. 5, 2017, 7 Pages.

"Non Final Office Action Issued in U.S. Appl. No. 15/399,624", dated Nov. 24, 2017, 13 Pages.

"Notice of Allowance Issued in U.S. Appl. No. 15/399,624", dated Apr. 10, 2018, 5 Pages.

"International Preliminary Report on Patentability Issued in PCT Application No. PCT/US2016/062986", dated Dec. 18, 2017, 9 Pages.

"International Search Report & Written Opinion Issued in PCT Application No. PCT/US2017/068843", dated Mar. 23, 2018, 13 Pages.

"International Search Report and Written Opinion Issued in PCT Application No. PCT/US2017/068848", dated Mar. 28, 2018, 16 Pages.

FIG. 3

| 19.7 | 19.3 | 18.9 | 18.5 | 18.1 | 17.7 | 17.2 | 17.7 | 18.1 | x | 6.4 | 6.0 |
|---|---|---|---|---|---|---|---|---|---|---|---|
| 18.7 | 18.3 | 17.9 | 17.5 | 17.1 | 16.7 | 16.2 | 16.7 | 17.1 | x | 5.4 | 5.0 |
| 17.7 | 17.3 | 16.9 | 16.5 | 16.1 | 15.7 | 15.2 | 15.7 | 16.1 | x | 4.4 | 4.0 |
| 16.7 | 16.3 | 15.9 | 15.5 | 15.1 | 14.7 | 14.2 | 14.7 | 15.1 | x | 3.4 | 3.0 |
| 16.3 | 15.3 | 14.9 | 14.5 | 14.1 | 13.7 | 13.2 | 13.7 | 14.1 | x | 2.4 | 2.0 |
| 15.9 | 14.9 | 13.9 | 13.5 | 13.1 | 12.7 | 12.2 | 12.7 | 13.1 | x | 1.4 | 1.0 |
| 15.5 | 14.5 | 13.5 | 12.5 | 12.1 | 11.7 | 11.2 | 11.7 | 12.1 | x | 1.0 | L |
| 15.1 | 14.1 | 13.1 | 12.1 | 11.1 | 10.7 | 10.2 | 10.7 | 11.1 | x | 1.4 | 1.0 |
| 14.7 | 13.7 | 12.7 | 11.7 | 10.7 | 9.7 | 9.2 | 9.7 | 10.7 | x | 2.4 | 2.0 |
| x | x | x | x | x | x | 8.2 | x | x | x | 3.4 | 3.0 |
| 13.8 | 12.8 | 11.8 | 10.8 | 9.8 | 8.8 | 7.8 | 6.8 | 5.8 | 4.8 | 4.4 | 4.0 |

US 10,293,259 B2

CONTROL OF AUDIO EFFECTS USING VOLUMETRIC DATA

CROSS REFERENCE TO RELATED APPLICATIONS

This application is a continuation-in-part of U.S. patent application Ser. No. 14/964,390, filed Dec. 9, 2015, the entirety of which is hereby incorporated herein by reference.

BACKGROUND

As computer software and hardware have become more powerful and advanced, media environments, such as video game environments, have become richer and more realistic. Graphics, movement of characters and avatars, and the interaction of various visual elements have all become increasingly realistic. Despite the advances in other aspects of media environments, however, providing realistic sound remains extremely difficult and computationally complex. Conventional approaches to simulating realistic sound also typically requires developers to hard code for specific sound environments, which is very human intensive and does not allow for adapting to changes in the media environment and/or new media environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are provided for processing sound based on characteristics of a computer environment. One example method for processing sound in a computer environment includes recognizing a location of a listener in the computer environment, identifying a shape matrix including, for each of a plurality of vectors intersecting the location of the listener, a distance from the location of the listener to an environmental boundary of the computer environment along the vector, selecting an audio filter based on the shape matrix, and outputting sound filtered by the audio filter.

BRIEF DESCRIPTION OF THE DRAWINGS

FIG. 3 is diagram illustrating an example 2D voxel-based representation of a media environment, the voxel-based representation indicating distance from each clear voxel to a listener location and an audio path in which the sound travels around an obstruction to reach the listener location.

DETAILED DESCRIPTION

Figure 1:
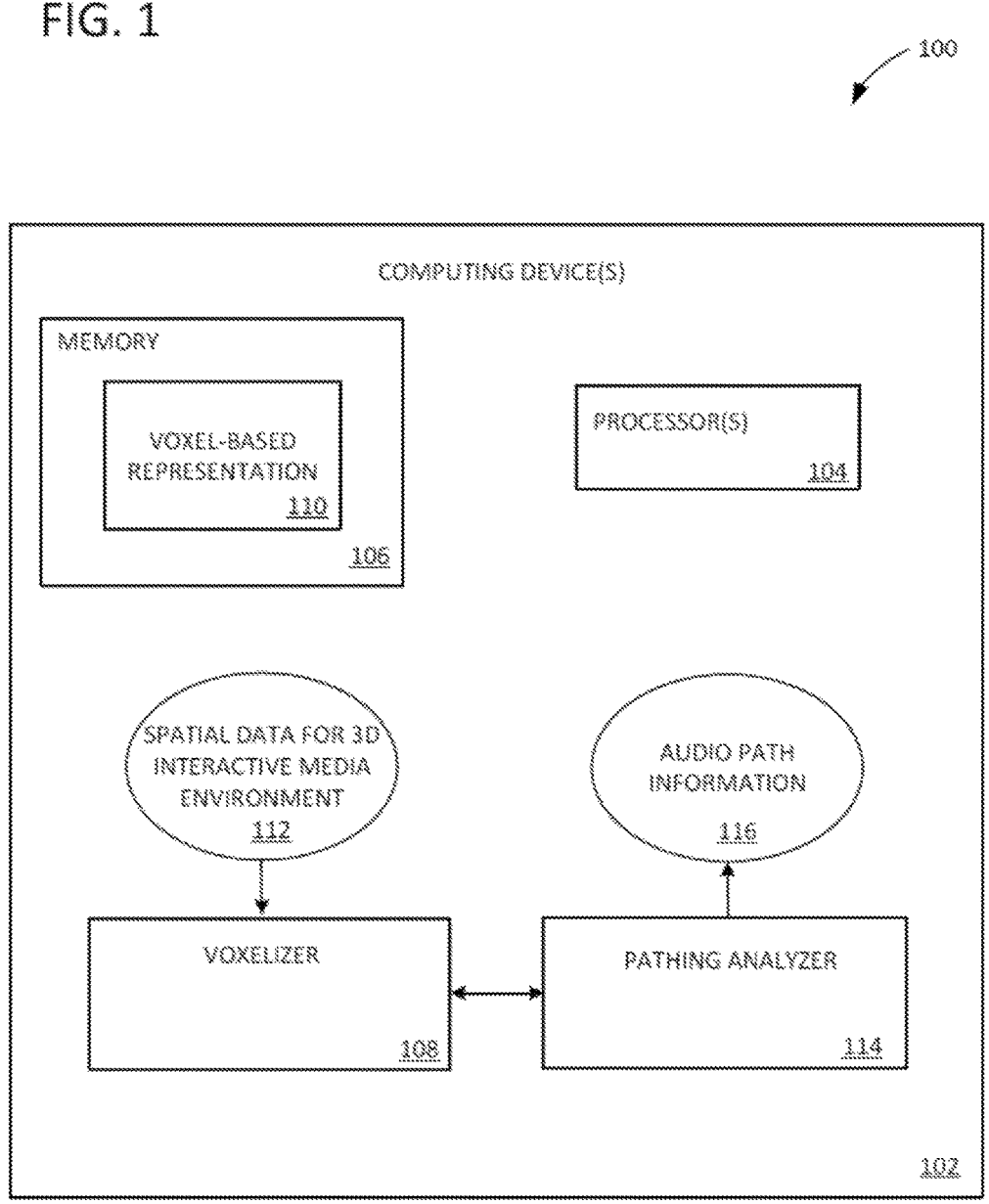
FIG. 1 is a block diagram of an example acoustic adjustment system.

Using the systems, methods, and computer-readable media described herein, acoustics in 3D media environments can be adjusted in real time to accurately reflect the characteristics of the media environment. Unlike conventional attempts to realistically simulate sound in media environments, the described examples allow real-time analysis by using a computationally efficient voxel-based representation of the 3D media environment. The described examples can also account for both the distance sound travels, including indirect paths, as well as reverberation in the listener's immediate area and reverberation in a sound emitter's immediate area, allowing a realistic acoustic simulation.

As an example, in a video game environment, spatial information (e.g., dimensions, locations of visual elements, etc.) representing the video game environment can be used to generate a voxel-based representation of the video game environment in which the volume of the game environment is divided into a number of voxels (e.g., equally sized cubes). The voxel-based representation is a simplified representation of the video game environment that allows for faster and more computationally efficient acoustic propagation calculations. For voxels containing visual elements (also referred to as "geometry") of the video game environment (such as walls, trees, etc.), the voxels can be designated as "blocked" to indicate an obstruction to sound.

A clear-voxel distance, which accounts for obstruction by blocked voxels, can be determined from the locations of sound emitters to the current, position of a listener. This clear-voxel distance can be used to adjust the audio generated in the video game environment to more closely correspond to what a listener would actually hear given the locations of the sound emitters and the known obstructions (blocked voxels). For example, if the sound takes an indirect path around obstructions, and the indirect path is twice as far as a direct path (assuming no obstructions were present), some of the high-frequency components of the sound will be disproportionately attenuated by the increased distance as compared to the low-frequency components of the sound.

In a further example, acoustic properties of the media environment may be determined according to volumetric data of the media environment and sound properties of elements within the media environment. For example, a shape matrix defining the size and/or shape of a space of the media environment in which a listener and/or sound emitter are located may be generated. Desired audio filters, reverb, delay, and/or other acoustic properties may be selected based on the shape matrix and used to process output audio. Such an approach may allow for rapid and efficient audio adjustments that provide realistic audio that adapts to the video game environment, even as the listener, sound emitter, and/or video game environment elements change.

The shape matrix may be generated, for example, by determining a distance from the listener to the nearest blocked voxel in many directions, and in some examples, the shape matrix may also include the type of material and corresponding acoustic properties of the blocked voxels. The locations of blocked voxels inform the way in which sound is blocked, absorbed, reflected, etc., around the listener. For example, if a flat concrete wall in the 3D media environment (represented as blocked voxels) is six inches behind the listener, sound will reverberate differently than if the nearest blocked voxel is a bush 20 feet behind the listener.

In the described examples, the computational complexity of determining audio path information (e.g., distance between sound emitters and the listener), audio redirection, and/or reverberation is reduced through the voxel-based approach, which reduces the amount of processing power, memory, and energy needed to accurately simulate acoustics in the media environment and allows the simulated acoustics to be updated in real time as the location of the listener changes, the locations of sound emitters change, or the geometry of the media environment changes. Examples are described below with reference to FIGS. 1-20.

FIG. 1 illustrates an acoustic adjustment system 100 implemented on one or more computing device(s) 102. Computing device(s) 102 includes processor(s) 104 and a memory 106. A voxelizer 108 is configured to, by processor(s) 104, generate a voxel-based representation 110 of a three-dimensional (3D) interactive media environment. For example, voxelizer 108 can receive spatial information 112 representing the 3D interactive media environment, such as coordinate values demarcating a volume extent of the environment and coordinates or other information indicating the location of visual elements in the environment. Voxelizer 108 can then divide the volume into voxels. As used herein, voxels are volume elements (units of volume) s to how pixels are two-dimensional (2D) area elements. Voxels can be, for example, cubes of a uniform size. Voxelizer 108 can divide a volume according to different resolutions (i.e., different numbers of voxels per unit of measured volume). The 3D interactive media environment can be, for example, a video game environment, a virtual reality environment, or an augmented reality environment.

Voxel-based representation 110 is a simplified representation of the 3D interactive media environment, and different resolutions allow for more or less accuracy (where a lower resolution results in a lower computational complexity). Voxelizer 108 can be configured to store voxel-based representation 110 in memory 106. Voxelizer 108 can also be configured to identify, by the processor, a plurality of blocked voxels. Blocked voxels are voxels that intersect visual elements of the 3D interactive media environment. Information indicating the location of visual elements can be included in the spatial information 112 and can also be referred to as the "geometry" or "triangles" of the environment. Voxelizer 108 can determine intersections of visual elements with voxels by comparing the locations of the geometry with the extent of the individual voxels if there is an intersection, voxelizer 108 can designate the entire voxel as blocked.

Blocked voxels can obstruct or occlude sound. As used herein, "obstruction" refers to one or more blocked voxels that prevent at least some sound waves from propagating along a direct path to a listener but still allow an indirect path to the listener. As used herein, "occlusion" refers to a group of blocked voxels that prevent sound from propagating to the listener by either a direct or indirect path. An example of obstruction is a wall of a room with an open door separating a radio playing in the room from a listener standing outside the room. The wall of the room obstructs the most direct path for sound to travel from the radio to the listener (through the wall), but the sound can travel through the door and around to the listener. An example of occlusion is a radio playing inside of safe or other enclosure. In some instances, sound can propagate through a material even though the material blocks or completely encloses the sound. In such examples, a level of obstruction or an amount of occlusion can be determined by the material's audio propagation properties (also referred to as the material's audio "transparency").

A pathing analyzer 114 can be configured to determine, by processor 104 and for respective voxels of the plurality of voxels that are clear voxels, audio path information 116 representing a path of clear voxels between the voxel and a location of the listener. Clear voxels are voxels other than blocked voxels. The path of clear voxels indicates a path of sound, in the 3D interactive media environment, between a location corresponding to the voxel and the location of the listener. The path of clear voxels can be, for example, a shortest clear voxel path. In some examples, pathing analyzer 114 is configured to determine multiple clear voxel paths between individual clear voxels and the location of the listener, and audio path information 116 can represent the multiple, paths.

Figure 2:
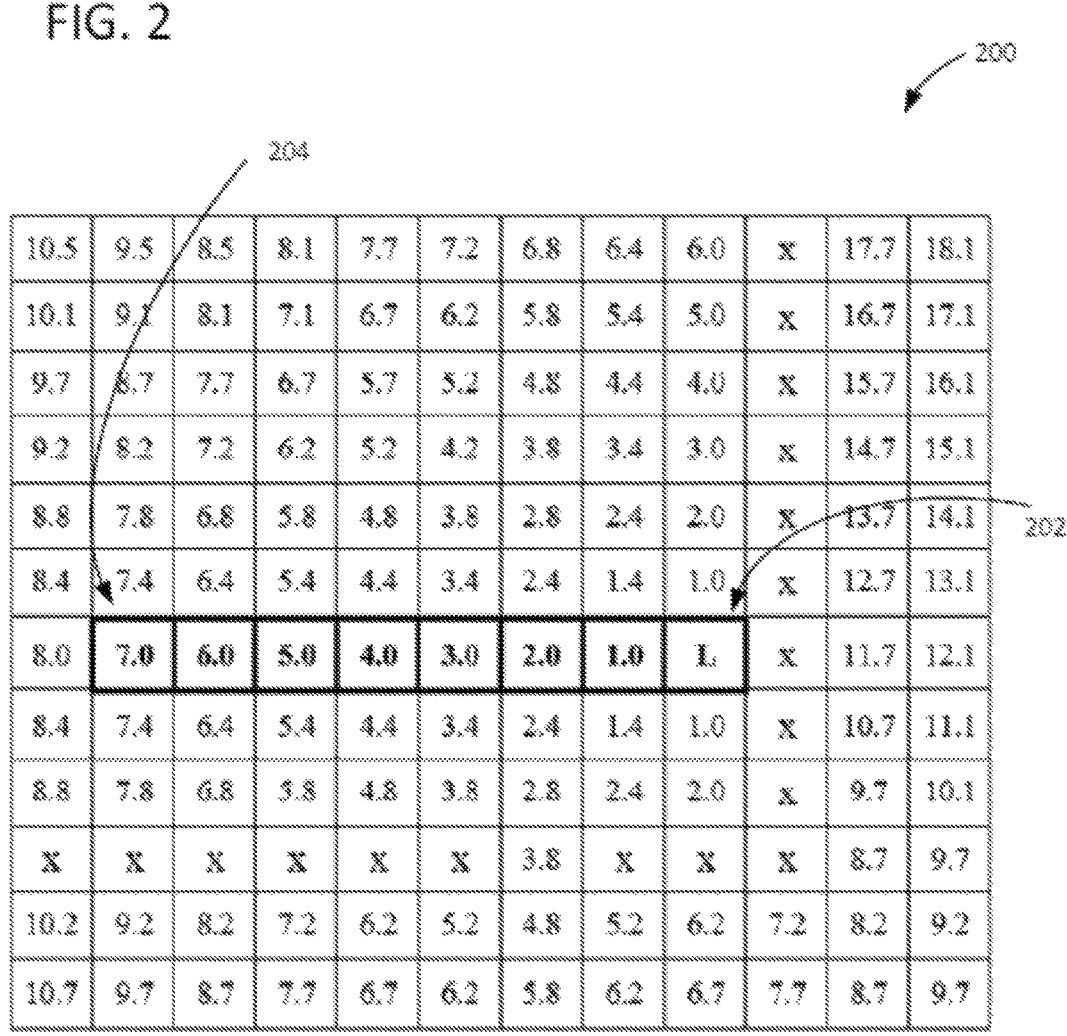
FIG. 2 is a diagram illustrating an example two-dimensional (2D) voxel-based representation of a media environment, the voxel-based representation indicating distance from each clear voxel to a listener location.

Audio path information 116 can include a length of the path of clear voxels. This is illustrated in FIGS. 2-3. FIG. 2 illustrates an example 2D voxel-based representation 200 of a media environment. FIG. 2 shows a 2D example for ease of illustration, which can be thought of as a volume cross section. In FIG. 2, blocked voxels are denoted with an "X." For clear voxels, a shortest clear-voxel distance to the listener is shown. The listener is located in voxel 202 and is denoted with an "L." The bolded voxels extending from voxel 204 to voxel 202 indicate a shortest clear voxel path between voxel 204 and voxel 202.

FIG. 3 illustrates another example 2D voxel-based representation 300 of a media environment. As in FIG. 2, in FIG. 3, blocked voxels are denoted with an "X," the listener is denoted with an "L" (in voxel 302), and clear voxels indicate a shortest clear-voxel distance to the listener. In FIG. 3, a number of blocked voxels create an obstruction between voxel 304 and the listener at voxel 302. If the blocked voxels were clear, a shortest path between voxels 304 and 302 would extend horizontally between voxels 304 and 302. Because of the obstruction, the shortest clear voxel path (shown by bolded boxes) is indirect and passes through-voxel 306. If voxel 306 were also blocked, then voxel 304 would be occluded from the listener in voxel 302. The path distance shown-in each voxel is calculated using the distance between voxel centers in the path. Accordingly, while the distance between a voxel and an adjacent horizontal or vertical voxel is 1.0, the distance between adjacent diagonal voxel centers, such as between voxel 308 and 310, is approximately 1.4 (the square root of two).

Returning to FIG. 1, audio path information 116 can also include an angle from the voxel to the next voxel of the path of clear voxels. In this way, each voxel on the clear voxel path is associated with the angle to the next voxel in the direction of the listener. The angle can be, for example, in the form of an x-direction, y-direction, and z-direction angle component or an x-direction, y-direction, and z-direction distance to the next voxel center.

Pathing analyzer 114 can be further configured to determine a ratio of the length of the path of clear voxels to a shortest distance between the voxel and the location of the listener. The shortest distance corresponds to the length of a line connecting the voxel and the location of the listener. The ratio indicates an audio adjustment that accounts for the length of the path of clear voxels, and can be used to determine an obstruction value. For example, if the clear voxel path is 20, and the shortest (direct, ignoring blocked voxels) path is 10, the ratio is 2:1. This can be converted to an obstruction value through a variety of approaches. In one example, obstruction values of 0.0 result when the ratio is 1:1, and obstruction values of 1.0 result when the ratio is infinity (or very large):1. Occlusion can be indicated with values of 1, for example, if a voxel is occluded, and 0 if the voxel is not occluded.

The length of the acoustic path that audio travels can affect the frequency composition of a received signal as compared to an emitted signal. For example, over long distances, higher frequency components of an audio signal tend to attenuate disproportionately to lower frequency components. Given knowledge of the ratio between the clear voxel path traveled and what a direct path (absent blocked voxels) would have been allows the frequencies of the audio received at the listener location to be adjusted accordingly for realistic simulation.

Pathing analyzer 114 can determine audio path information 116 through, for example, a floodfilling approach in which after a starting voxel is examined, an adjacent voxel is examined, followed by another, etc., until the entire clear voxel space of voxel-based representation 110 has been examined.

Pathing analyzer 114 can store audio path information 116, and an application such as a video game application or virtual reality application can provide locations of sound emitters. The voxel(s) corresponding to the sound emitter can be identified by system 100, and audio path information for the voxel can be accessed, providing a "look up" of audio path information given a location.

Pathing analyzer 114 can perform floodfilling or other approaches to determine audio path information 116 for the respective clear voxels again periodically or upon determining that the 3D interactive media environment has changed, a sound emitter has moved, or the listener has moved.

Frequent updates can be performed with limited computing resources because of the computational efficiency of using ed representation 110.

Figure 4:
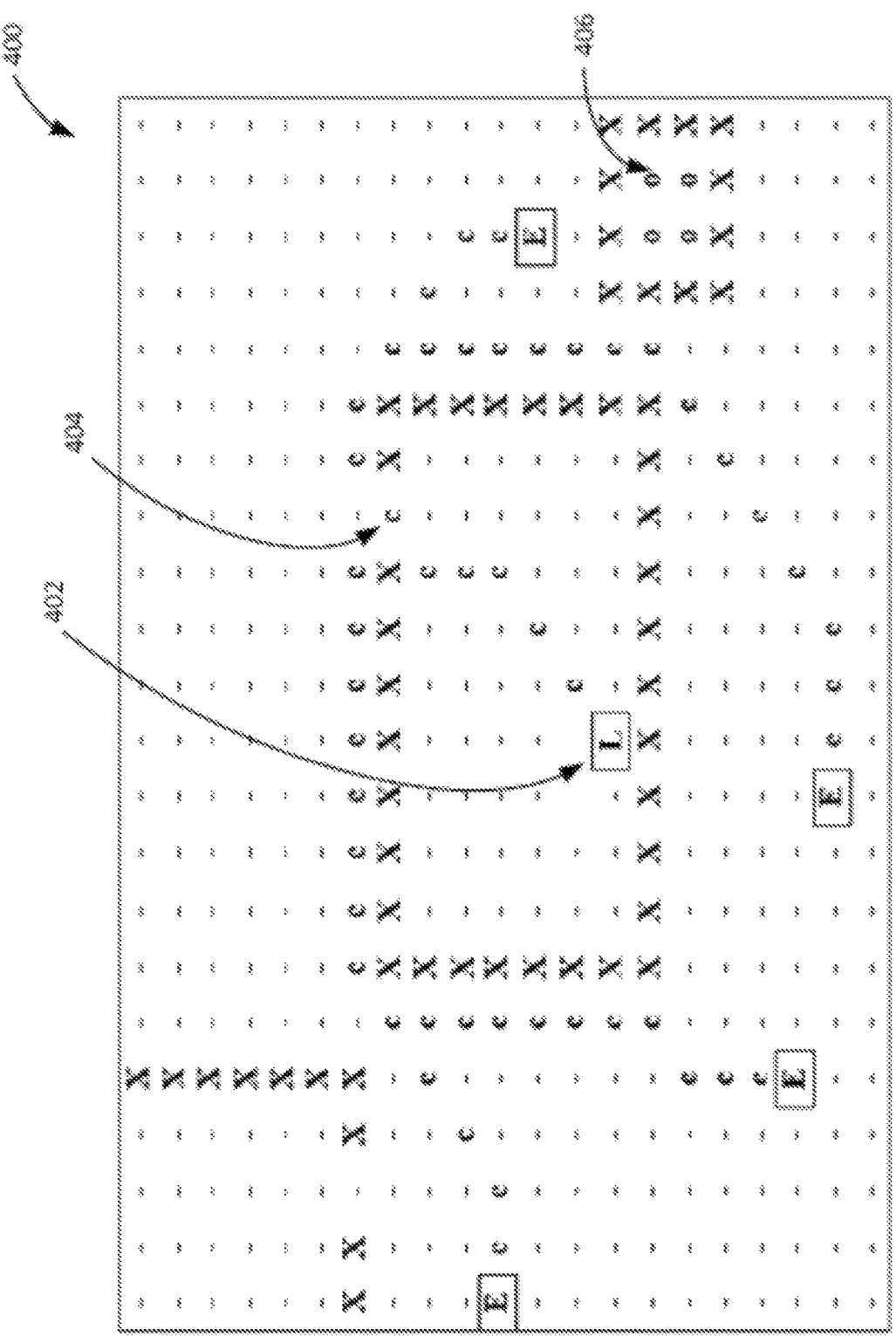
FIG. 4 is a diagram illustrating an example 2D voxel-based representation of a media environment, the voxel-based representation indicating audio paths from sound emitters, around obstructions, to a listener location.
Figure 5:
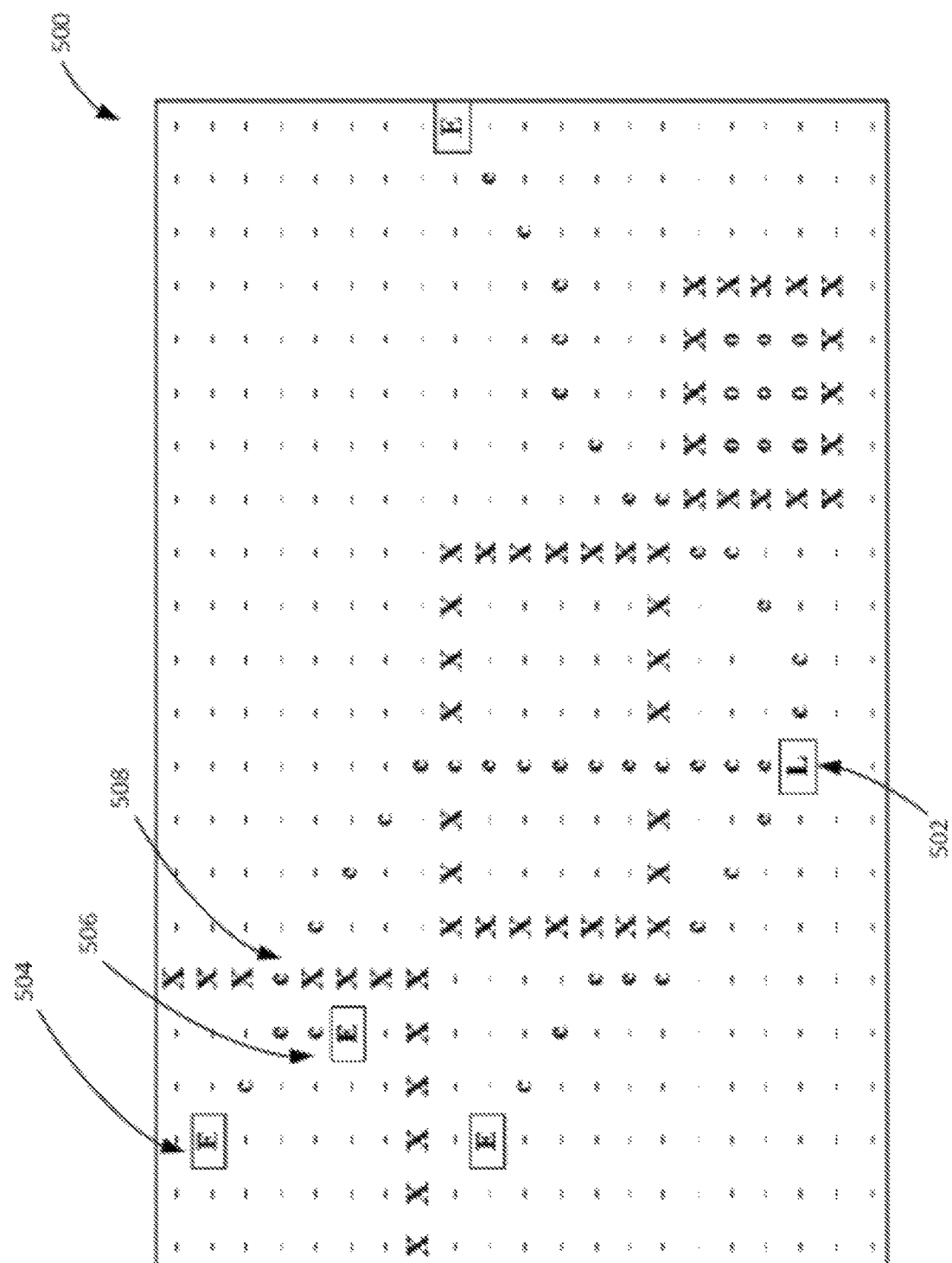
FIG. 5 is a diagram illustrating another example 2D voxel-based representation of a media environment, the voxel-based representation indicating audio paths from sound emitters, around obstructions, to a listener location, where the sound emitter locations and listener locations being different from the diagram of FIG. 4.
Figure 6:
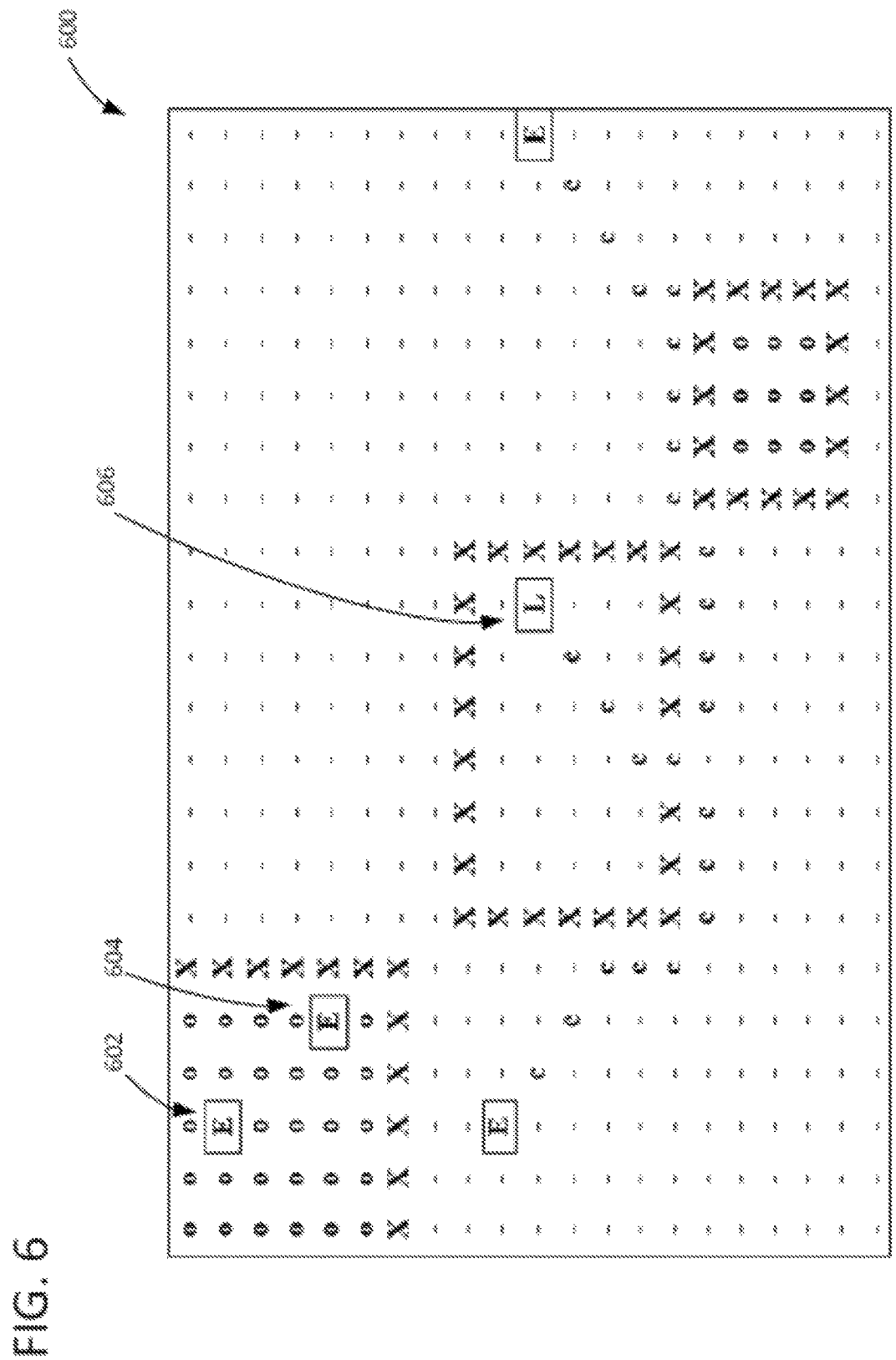
FIG. 6 is a diagram illustrating another example 2D voxel-based representation of a media environment, the voxel-based representation indicating audio paths from sound emitters, around obstructions, to a listener location, where two of the sound emitters are occluded.

FIGS. 4-6 illustrate additional 2D examples in which sound emitters, blocked voxels, and a listener are located. In 2D voxel-based representation 400 of FIG. 4, a listener 402 is mostly surrounded by blocked voxels (denoted by an "X"). Clear voxels are denoted with "-", sound emitters are denoted as "E" surrounded by a box, and voxels along the clear-voxel path from the sound emitters to listener 402 are indicated as "c". The grid framework shown in FIGS. 2 and 3 is omitted for clarity, as are path distances. Because of listener 402's location inside a rectangle of blocked voxels with only one clear voxel, voxel 404, the clear voxel path for each sound emitter passes through voxel 404. Voxel group 406 are occluded voxels, denoted with "o". The occluded voxels are entirely surrounded by blocked voxels, indicating that audio from the sound emitters cannot reach voxel group 406.

FIG. 5 illustrates 2D voxel-based representation 500. As in FIG. 4, "X" indicates blocked voxels, sound emitters are denoted as surrounded by a box, "c" indicates voxels along the clear-voxel path from the sound emitters to listener 502, and occluded voxels are denoted by an "o". In representation 500, sound emitted by both emitters 504 and 506 travels through clear voxel 508 on the clear voxel path to listener 502.

FIG. 6 illustrates 2D voxel-based representation 600. In FIG. 6, sound emitters 602 and 604 are occluded (completely surrounded by blocked voxels), and thus there is no clear voxel path from sound emitters 604 and 602 to listener 606.

Figure 7:
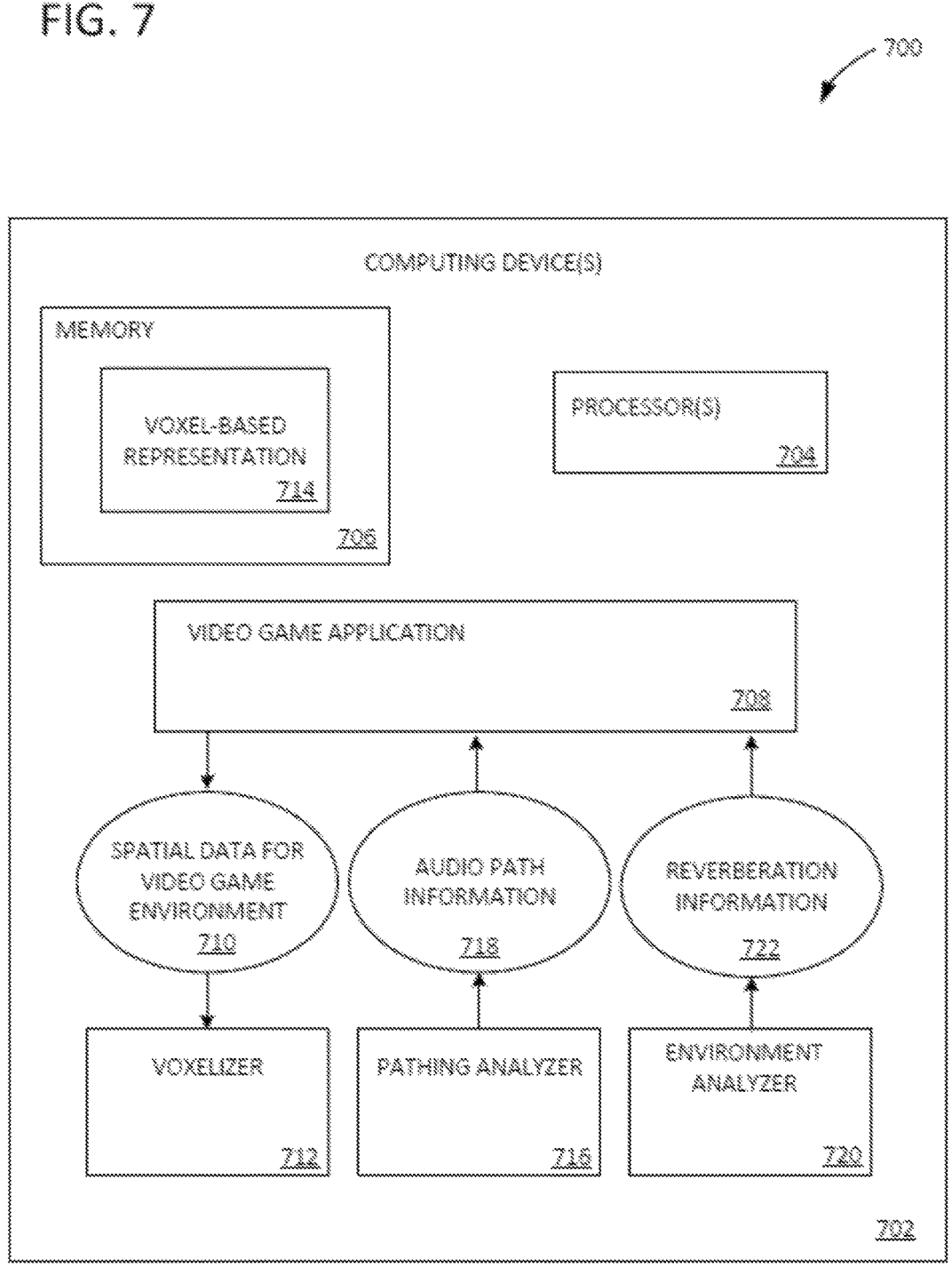
FIG. 7 is a block diagram of an example acoustic adjustment system that includes an environment analyzer.

FIG. 7 illustrates a system 700 implemented on one or more computing device(s) 702. Computing device(s) 702 includes processor(s) 704 and a memory 706. Computing device(s) 702 can be a game console, a desktop computer, laptop computer, mobile device, or other computing device. A video game application 708 is running on computing device 702 and provides spatial data 710 defining a 3D video game environment. A voxelizer 712, which can be similar to voxelizer 108 of FIG. 1, generates a voxel-based representation 714 of the game environment.

A pathing analyzer 716, which can be similar to pathing analyzer 114 of FIG. 1, determines audio path information 718, which can be similar to audio path information 116 of FIG. 1. An environment analyzer 720 is configured to determine, by processor 704, a distance, from the location of a listener, to a blocked voxel in respective directions of a plurality of directions. The distances indicate a sound reverberation adjustment to audio reaching, in the 3D interactive media environment, the location of the listener. In some examples, the nearest blocked voxel is determined in each of 26 directions from the location of the listener. Other numbers of directions are also contemplated. Environment analyzer 720 provides reverberation information 722 to video game application 708 based at least in part on the distances. Reverberation information 722 can include the distances and can also or alternatively include early reflection values and late reverberation values determined based on the distances.

Environment analyzer 720 can also be configured to determine, by processor 704, a distance, from the location of a sound emitter, to a blocked voxel in respective directions of a plurality of directions. The distances indicate a sound reverberation adjustment to the audio emanating, in the 3D interactive media environment, from the location of the sound emitter. As with the listener location, in some examples, the nearest blocked voxel is determined in each of 26 directions from the location of the sound emitter. Reverberation information 722 can also include the distances and/or early reflection values and late reverberation values for the sound emitter.

In some examples, environment analyzer 720 is further configured to determine, by processor 704, a material type of the blocked voxels in the respective directions. The material type indicates an additional sound reverberation adjustment to audio reaching, in the 3D interactive media environment, the location of the listener. For example, an aluminum surface reflects sound differently than a wood surface, and knowing the material type allows reverberation calculations to be adjusted. Material type information for the geometry of the game (and therefore for the blocked voxels) can be included with the spatial data 710 that defines the 3D video game environment.

In some examples system 700 also includes an audio mixer (not shown) configured to, by processor 704, adjust one or more audio signals that, in the 3D interactive environment, reach the location of the listener, the adjusting based at least in part on the audio path information. The audio mixer can be part of video game application 708 or can be a separate component of system 700.

In some examples, voxelizer 712, pathing analyzer 716, and environment analyzer 720 are implemented as a library, plugin(s), or application(s) accessible to video game application 708 and other applications through an application program interface (API). In such an arrangement, voxelizer 712, pathing analyzer 716, and environment analyzer 720 can be implemented on a computing device, and different video games or virtual reality applications can access them. Pathing analyzer 716 and environment analyzer 720 can be configured to provide different types of output (e.g., clear voxel path distance vs. ratio) depending upon the application interacting with voxelizer 712, pathing analyzer 716, and environment analyzer 720. In some examples, voxelizer 712, pathing analyzer 716, and environment analyzer 720 are part of video game application 708. In some examples, at least one of voxelizer 712, pathing analyzer 716, or environment analyzer 720 are implemented in the cloud and accessible via a cloud-based or local video game application or other application.

Figure 8:
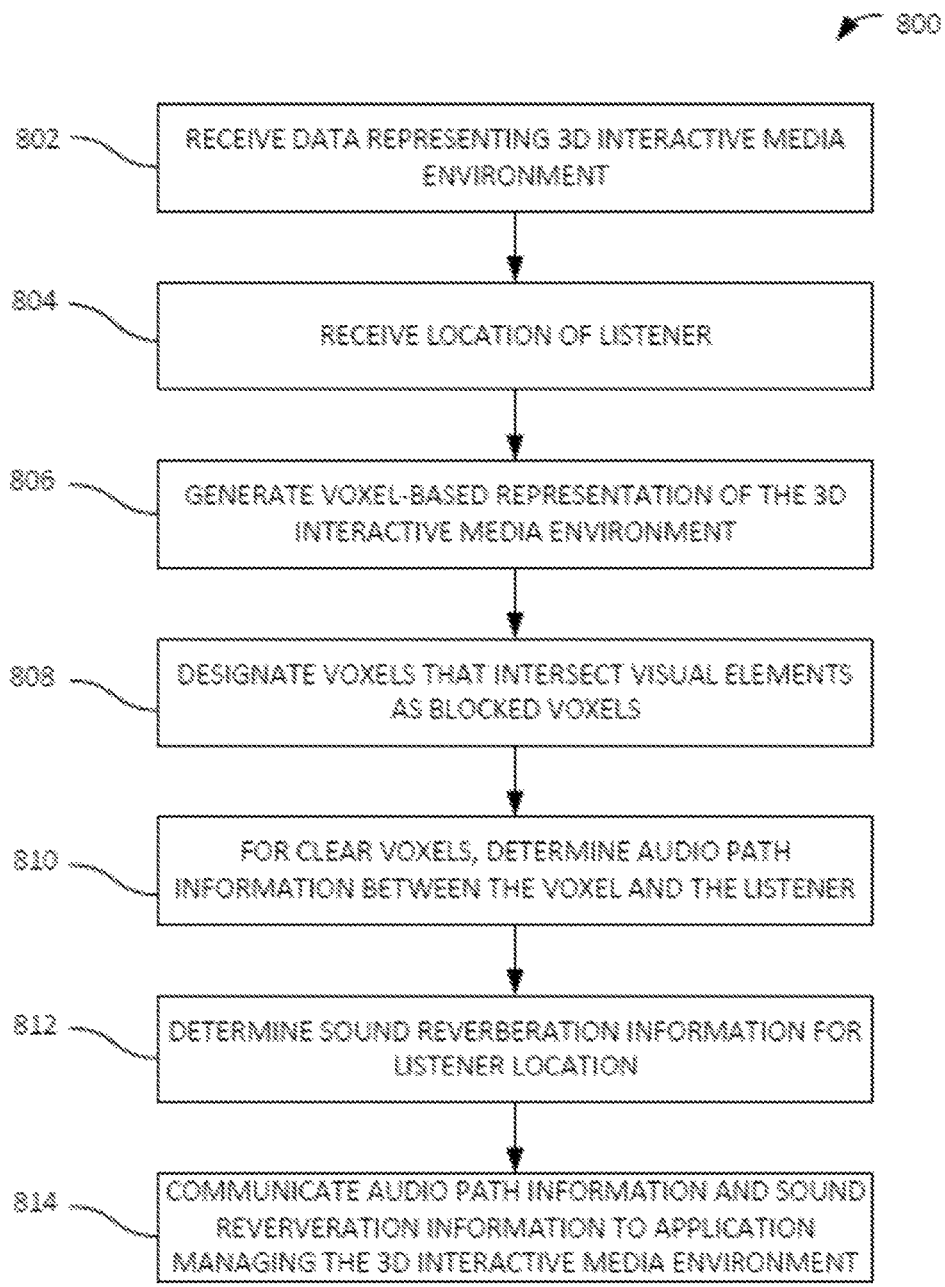
FIG. 8 is a flowchart illustrating an example acoustic adjustment method.

FIG. 8 illustrates a method 800 for acoustic adjustment. In process block 802, data representing a 3D interactive media environment s received. In process block 804, the location of a listener within the 3D interactive media environment is received. In process block 806, based on the data representing the 3D interactive media environment, a voxel-based representation of the 3D interactive media environment is generated. The voxel based representation can include a plurality of voxels of a uniform size. In process block 808, voxels, of the plurality of voxels, that intersect a visual element of the 3D interactive media environment are designated as blocked voxels.

For respective voxels of the plurality of voxels that are clear voxels, wherein clear voxels are voxels other than blocked voxels, audio path information between the voxel and the location of the listener is determined in process block 810. The audio path information can include clear voxel path distances, ratios of the clear voxel path to a direct path, angles to the next voxel along the clear voxel path, obstruction values, and/or occlusion values. In process block 812, sound reverberation information is determined for the location of the listener. In process block 814, both (i) the audio path information for one or more of the respective clear voxels and (ii) the sound reverberation information are communicated to an application managing the 3D interactive media environment (e.g., a video game or virtual reality application). Method 800 can be performed, for example, by system 100 of FIG. 1 and/or system 700 of FIG. 7.

Figure 9:
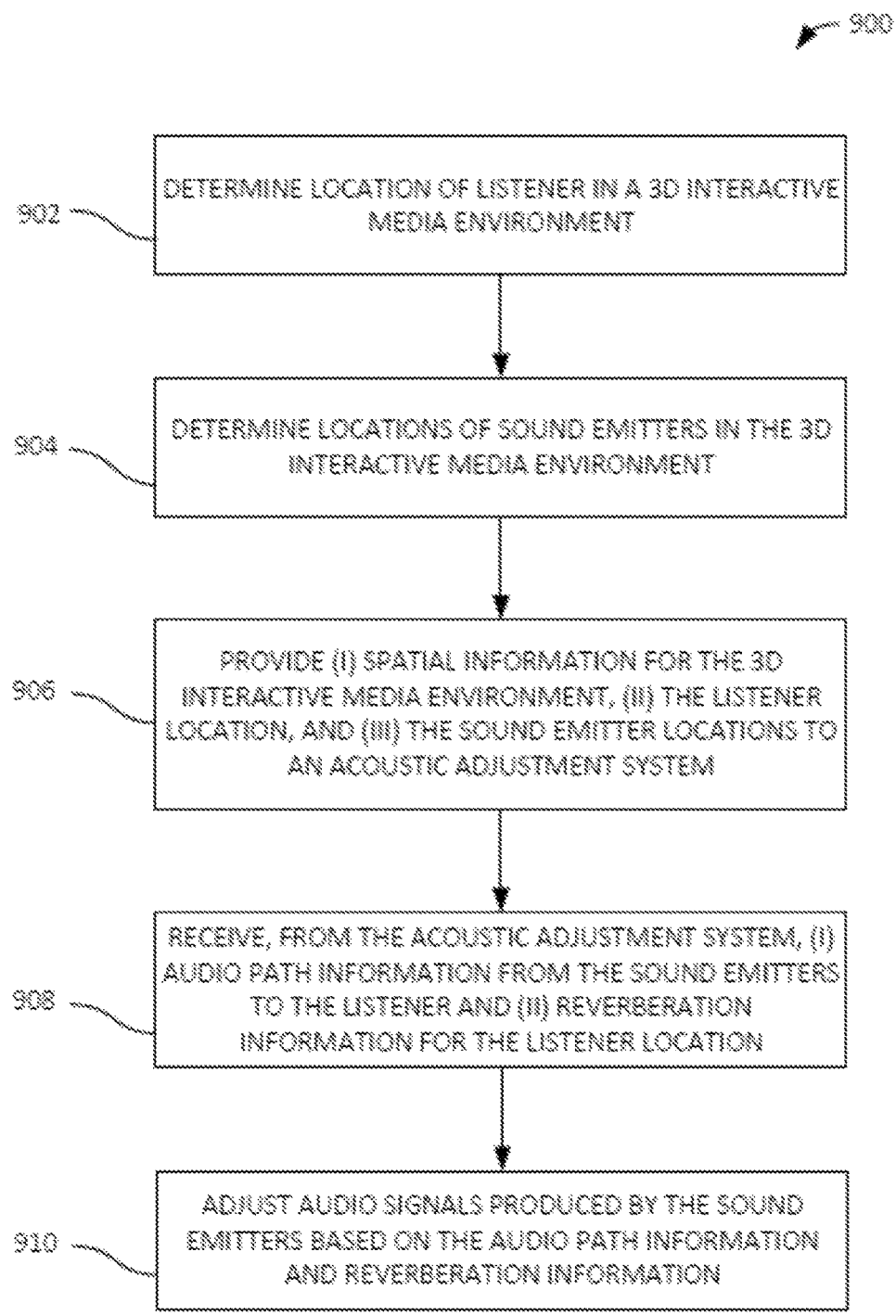
FIG. 9 is a flowchart illustrating an example acoustic adjustment method in which audio signals produced by sound emitters are adjusted.

FIG. 9 illustrates a method 900 for acoustic adjustment. In process block 902, the location of a listener in a three-dimensional (3D) interactive media environment is determined. In process block 904, locations of one or more sound emitters in the 3D interactive media environment are determined. In process block 906, (i) spatial information for the 3D interactive media environment, (ii) the location of the listener, and (iii) the location of the one or more sound emitters are provided to an acoustic adjustment system configured to generate a voxel-based representation of the 3D interactive media environment and analyze the propagation of audio signals within the 3D interactive media environment. The acoustic adjustment system can be similar to, for example, system 100 of FIG. 1 or system 700 of FIG. 7. In process block 908, (i) audio path information from the locations of the one or more sound emitters to the location of the listener and (ii) reverberation information for the location of the listener are received from the acoustic adjustment system. In process block 910, audio signals produced by the one or more sound emitters are adjusted based on the audio path information and the reverberation information. Method 900 can be performed, for example, by a computing device running a video game, virtual reality application, or augmented reality application.

In some examples, a media environment is very large and contains a large amount of empty space. As an example, consider a first-person boat navigating through a largely empty ocean to a distant island. In such examples, different portions of the game volume can be defined over which a voxel-based representation can be created and audio path information etc., generated, and some portions for which a voxel-based representation is not generated. To continue the above example, the "local" environment around the boat, and perhaps the environment around the distant island, can be voxelized, and audio paths can be determined in accordance with the described approaches, but much of the empty ocean environment is not analyzed (e.g., clear voxel paths are not determined) to save computing power. In such cases, sound reaching the edge of the island environment can be propagated to the local boat environment using a simple straight-line propagation path. In this example, updates performed as the listener moves in the media environment can trigger a redetermination of clear voxel paths for the local environment and distant island environment rather than for the entire environment.

Example Computing Systems

Figure 10:
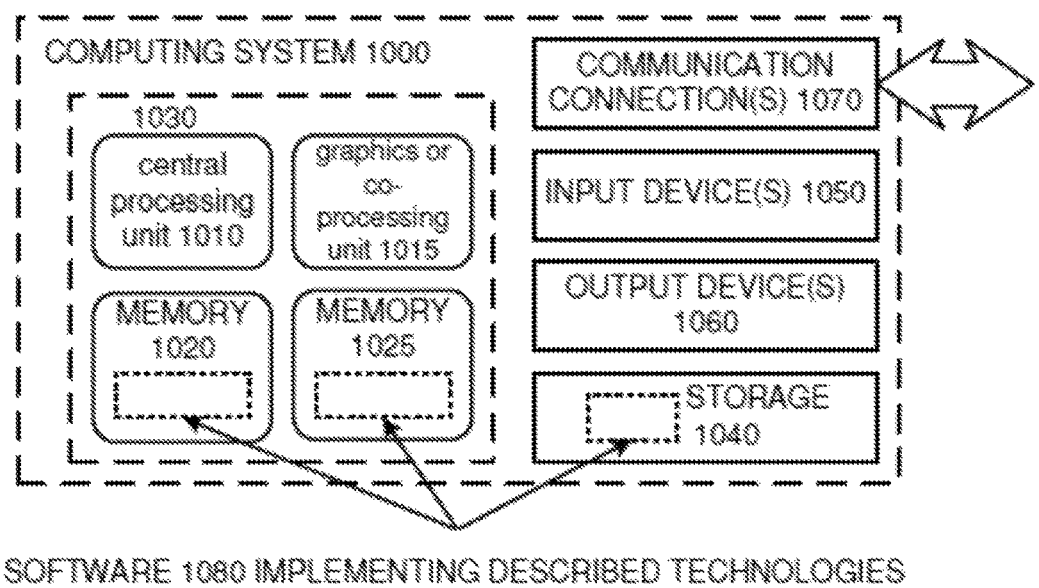
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any as to scope of use or functionality, s the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions processing unit can be a general purpose central processing unit (CPU), processor in an application specific integrated circuit (ASIC), or any other type of processor. In a multi processing system, multiple processing units execute computer executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer executable instructions suitable for execution by the processing unit(s). For example, memory 1020, 1025 can store voxelizer 108 and/or pathing analyzer 114 of FIG. 1 and/or voxelizer 712, pathing analyzer 716, and/or environment analyzer 720 of FIG. 7.

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not show) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which be used to store information and which can be accessed within the computing system 1000. The storage 1040 stores instructions for the software 1080 implementing one or more innovations described herein. For example, storage 1040 can store voxelizer 108 and/or pathing analyzer 114 of FIG. 1 and/or voxelizer 712, pathing analyzer 716, and/or environment analyzer 720 of FIG. 7.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed i such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 11:
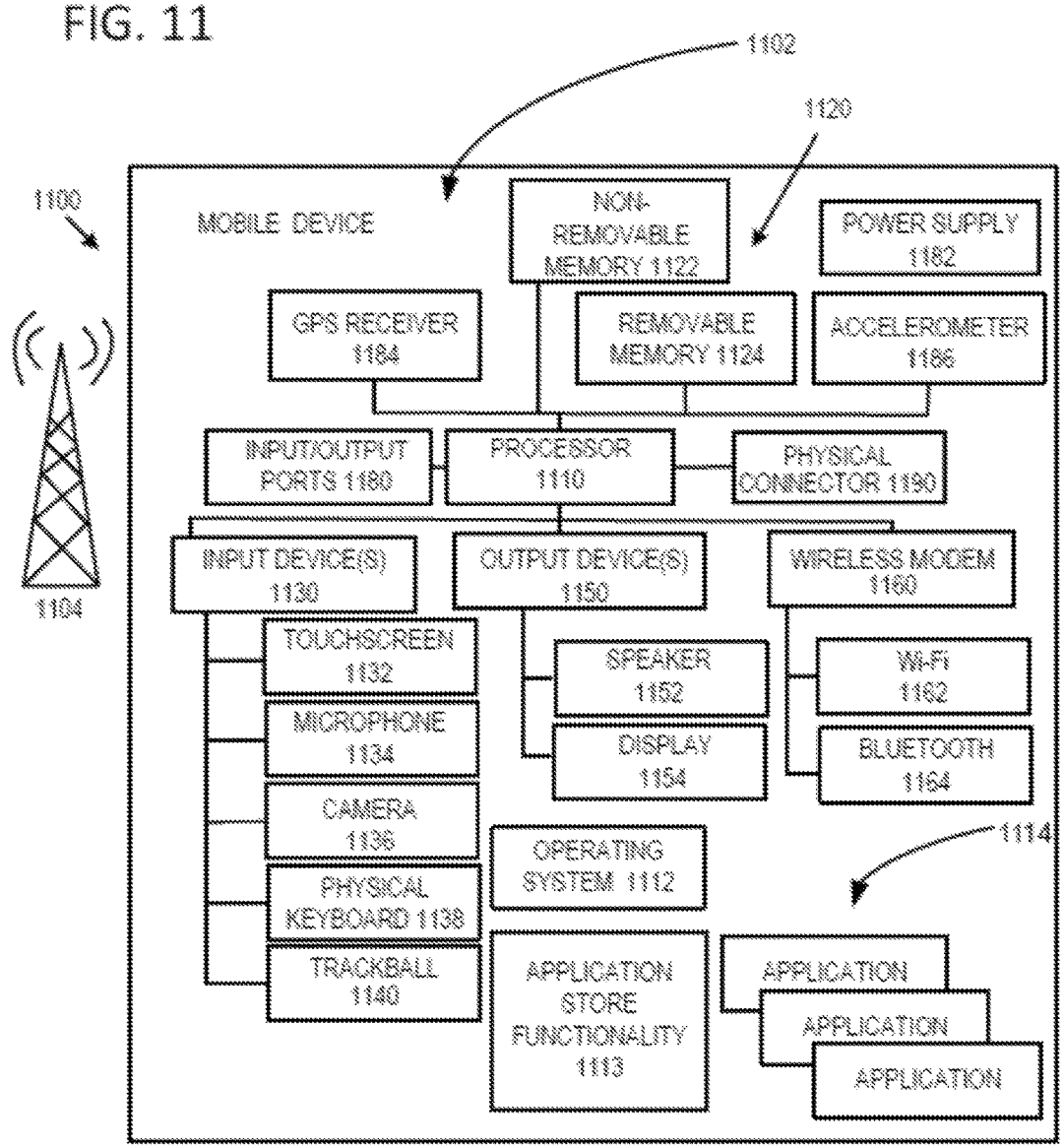
FIG. 11 is an example mobile device that can be used in conjunction with the technologies described herein.

FIG. 11 is a system diagram depicting an example mobile device 1100 including a variety of optional hardware and software components, shown generally at 1102. Any components 1102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application. The application programs 1114 can also include image recognition technology implemented using convolutional neural networks. Functionality 1113 for accessing an application store can also be used for acquiring and updating application programs 1114.

The illustrated mobile device 1100 can include memory 1120. Memory 1120 can include, non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an international Mobile Subscriber identity (IMSI), and an equipment identifier, such as an International Mobile Equipment Identifier (IMEI), Such identifiers can be transmitted to a network server to identify users and equipment.

The mobile device 1100 can support one or more input devices 1130, such as a touchscreen 1132, microphone 1134, camera 1136, physical keyboard 1138 and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

Example Cloud-Supported Environments

Figure 12:
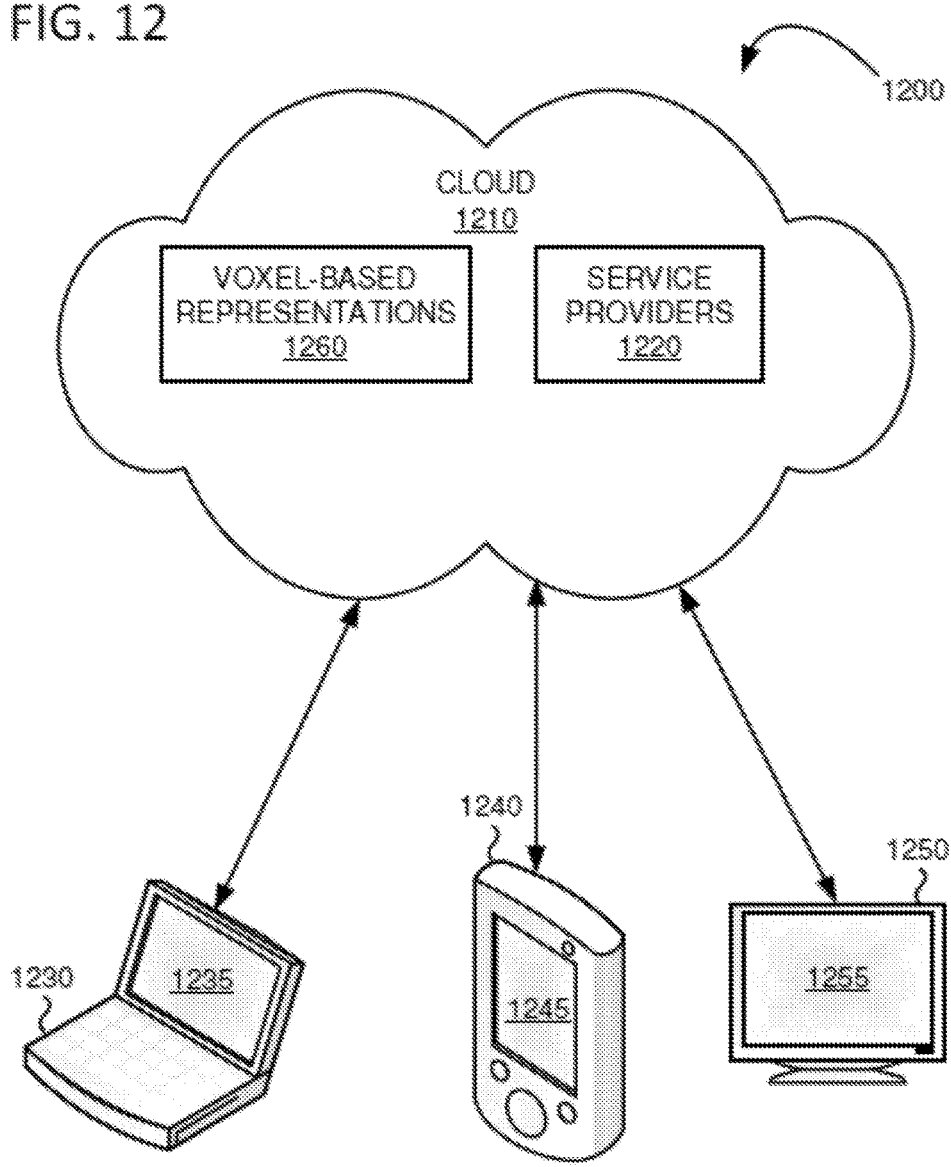
FIG. 12 is an example cloud-supported environment that can be used in conjunction with the technologies described herein.

FIG. 12 illustrates a generalized example of a suitable cloud-supported environment 1200 in which described embodiments, techniques, and technologies may be implemented. In the example environment 1200, various types of services (e.g., computing services) are provided by a cloud 1210. For example, the cloud 1210 can comprise a collection of computing devices, which may be located centrally or distributed, that provide cloud-based services to various types of users and devices connected via a network such as the Internet. The implementation environment 1200 can be used in different ways to accomplish computing tasks. For example, some tasks (e.g., processing user input and presenting a user interface) can be performed on local computing devices (e.g., connected devices 1230, 1240, 1250) while other tasks (e.g., storage of data to be used in subsequent processing) can be performed in the cloud 1210.

In example environment 1200, the cloud 1210 provides services for connected devices 1230, 1240, 1250 with a variety of screen capabilities. Connected device 1230 represents a device with a computer screen 1235 (e.g., a mid size screen) For example, connected device 1230 can be a personal computer such as desktop computer, laptop, notebook, netbook, or the like. Connected device 1240 represents a device with mobile device screen 1245 (e.g., a small size screen). For example, connected device 1240 can be a mobile phone, smart phone, personal digital assistant, tablet computer, and the like. Connected device 1250 represents a device with a large screen 1255. For example, connected device 1250 can be a television screen (e.g., a smart television) or another device connected to a television (e.g., a set-top box or gaining console) or the like. One or more of the connected devices 1230, 1240, 1250 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touchscreen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users). The cloud 1210 can store voxel-based representations 1260 used in acoustic adjustment as described herein.

Thus, as explained above, when audio propagates through the real world, the shape of the environment may alter the perceived characteristics (e.g., directionality, echo, dampening, and/or tone) of the audio. In a real-time computer environment, such as a game, the geometry that forms the virtual world may be assessed for paths that would best represent the direction of a sound, and the audio that is output may be adjusted so that the sound is perceived to travel from the emitter location along the identified direction(s). By identifying open/direct paths from a listener, it is possible to then redirect a portion of audio that is lying in an obstructed path to the nearest relevant opening/unobstructed path. For example, when a sound happens behind a brick wall, it is possible for the audio to instead sound like it is coining from around the wall. As mentioned previously, a clear-voxel distance may be determined from the locations of sound emitters to the current position of a listener and used to redirect the path of the audio.

In some examples, the volumetric data that defines the media environment may be used to identify environmental acoustic properties of the media environment, such as the shape and size of the environmental boundaries that define spaces within the media environment. The environmental acoustic properties may be represented by a shape matrix generated by projection of a plurality of vectors originating from the location of the listener and/or the location of the sound emitter. The shape matrix may include, for each vector, a distance to a nearest environmental boundary (e.g., wall, tree) and a sound density of the nearest environmental boundary. Based on the environmental acoustic properties, an appropriate audio filter pray be selected to filter output audio.

Figure 13:
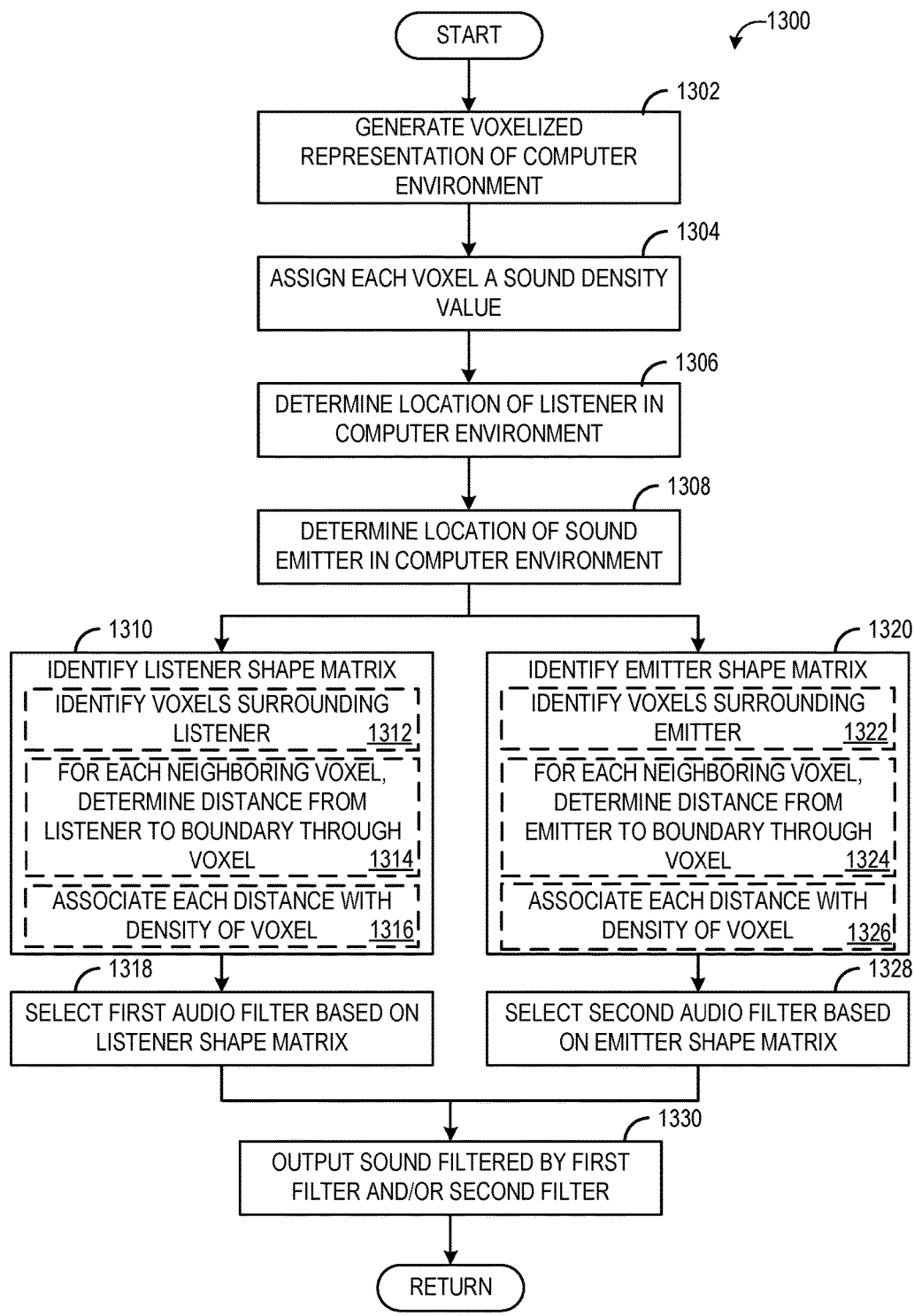
FIG. 13 is a flow chart illustrating an example method for processing sound based on volumetric data of a computer environment.

FIG. 13 illustrates a method 1300 for controlling audio effects based on volumetric data in a computer environment. Method 1300 may be carried out by a computing device, such as adjustment system 100, system 700, computing system 1000, mobile device 1100, cloud-based environment 1200, and/or computing system 2000. At 1302, method 1300 includes generating a voxelized representation of a computer environment. The voxelized representation of the computer environment may be generated as described above with respect to FIGS. 1 and 7. At 1304, method 1300 includes assigning each voxel in the voxelized representation an audio density value. The audio density values may represent a level of sound absorption/blocking provided by that voxel, based on properties of elements within the computer environment. For example, open space may have an audio density value of zero, while a concrete wall may have an audio density value of one. In some implementations, the audio density values are pre-programmed. Accordingly, assigning audio density values may include reading the pre-programmed values.

At 1306, method 1300 includes determining a location of a listener in the computer environment. The location of the listener may include one or more voxels in the voxelized representation that correspond to a position of the listener within the computer environment. The listener may include an avatar, player in a game, virtualized microphone, and/or user of the computer environment, and the location of the listener may or may not correspond to a location of a user of the computing device in the real world. At 1308, method 1300 includes determining a location of a sound emitter in the computer environment. The location of the sound emitter may include one or more voxels in the voxelized representation that correspond to a position of the sound emitter within the computer environment. The sound emitter may include another avatar, game player, game element, or other suitable sound source, and may or may not represent a location of an actual sound source in the real world environment (e.g., a speaker).

Figure 14:
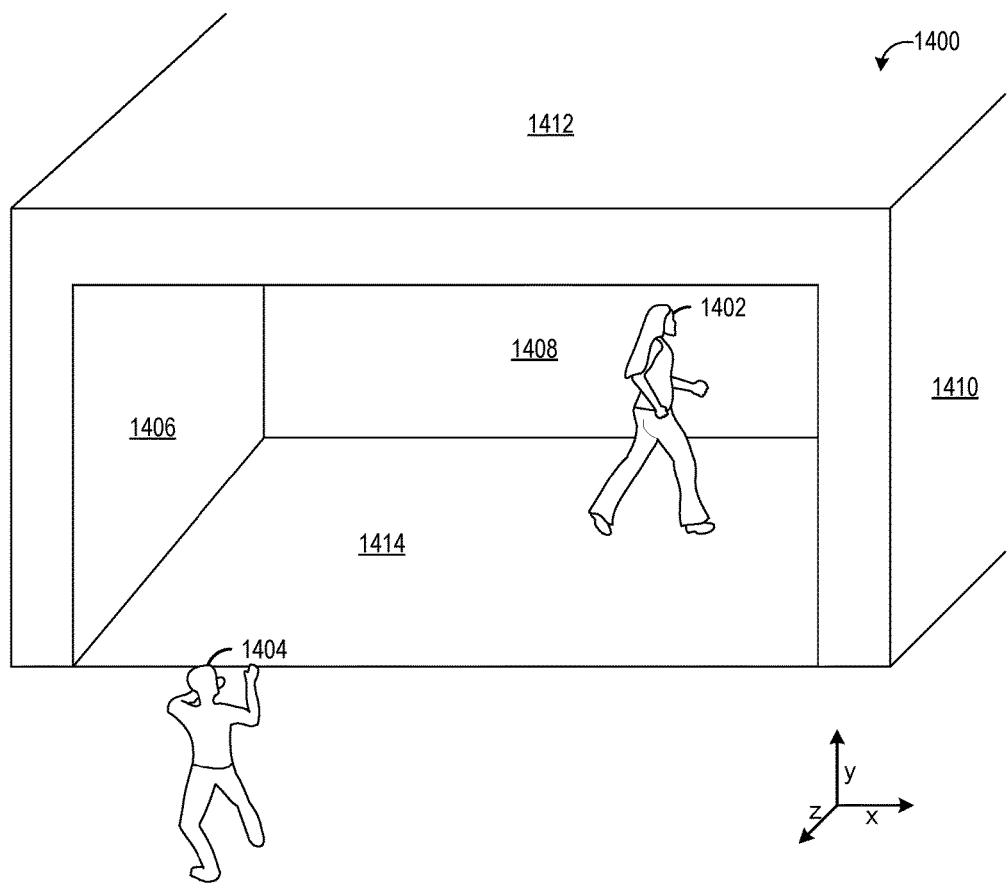
FIG. 14 schematically shows an example computer environment.

FIG. 14 illustrates an example computer environment 1400. Computer environment 1400 may be generated by a computing device, such as system 100, system 700, computing system 1000, mobile device 1100, cloud-supported environment 1200, or computing system 2000, running a video game, virtual reality application, or augmented reality application, for example. Computer environment includes a listener 1402 at which audio from a sound emitter 1404 may be received. For example, computer environment 1400 is in the form of a third person gaming environment, where listener 1402 may be an avatar or game character controlled by a player of the game. The sound emitter 1404 may be a non-player game character, multi-player game character, or other element of the computer environment. It is to be understood that the sound emitter is an element of the computer environment having a virtual location.

Computer environment 1400 includes visual elements that may include associated sound blocking, sound absorbing, sound reflecting, or other audio properties. For example, computer environment 1400 includes a cement bunker in which listener 1402 is located, where the bunker includes a first side wall 1406, back wall 1408, second side wall 1410, ceiling 1412, and floor 1414. When sound is emitted from sound emitter 1404, the sound may be perceived by listener 1402 differently when listener 1402 is located within the cement bunker relative to when listener 1402 is located outside of the cement bunker. As will be explained in more detail below, volumetric data defining the computer environment in the vicinity of the listener and/or sound emitter may be used to control audio effects (such as reverb, delays, frequency, and perceived direction of the audio) of the sound e fitted from the sound emitter in order for sound to be realistically emitted and perceived.

Figure 15:
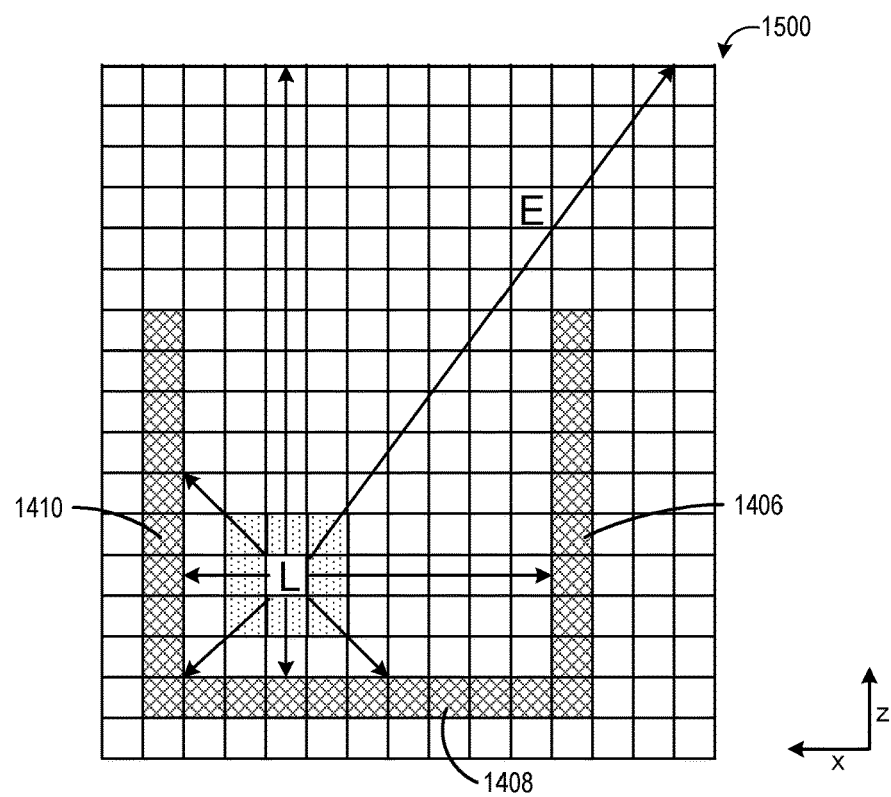
FIGS. 15-17 schematically show example cross-sectional views of a voxelized representation of the computer environment of FIG. 14.
Figure 16:
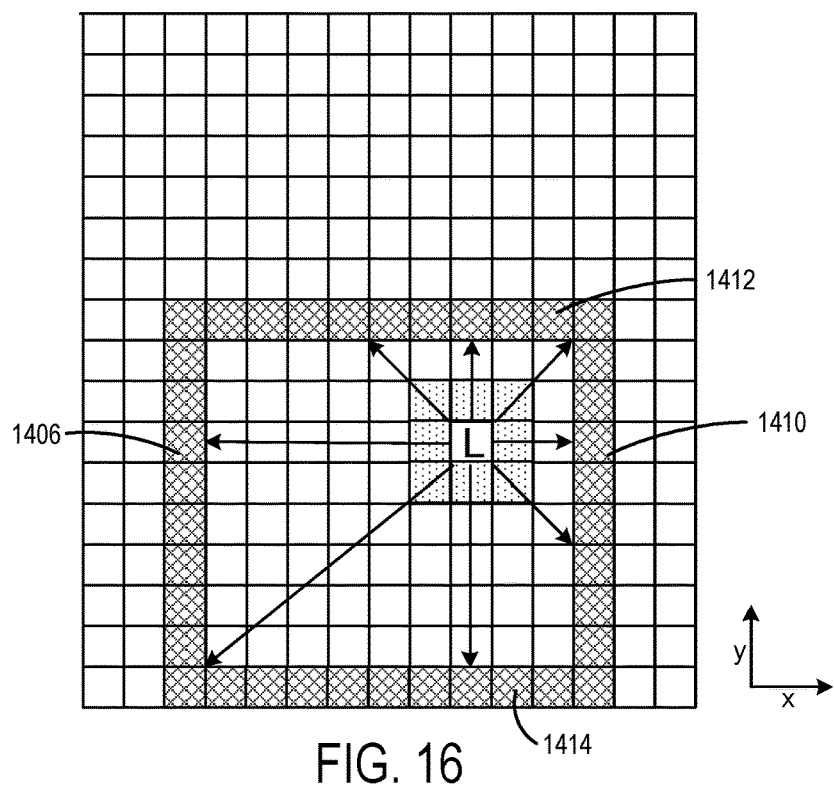
Figures 17, 18:
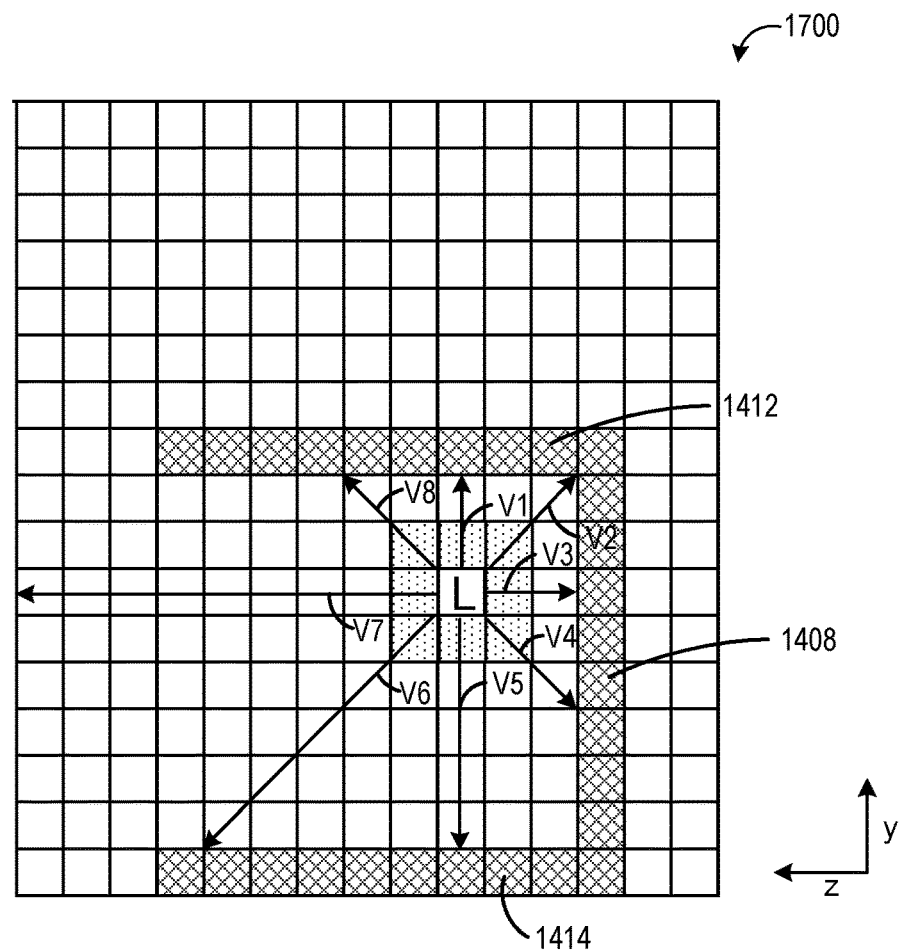
FIG. 18 shows an example shape matrix.

In one example, the volumetric data of the computer environment may be generated from the voxelized representation of the computer environment. FIGS. 15-17 show various cross-sectional views of a voxelized representation of computer environment 1400. Each square represents a voxel, with voxels that intersect a sound-blocking element of computer environment 1400 being classified as obstructed voxels and shown as hatched squares. The location of the listener is represented by the square marked L while the location of the sound emitter is represented by the square marked E.

For example, FIG. 15 shows a first cross-section view 1500 of the XZ plane of computer environment 1400 from FIG. 14. Accordingly, both side walls (first side wall 1406 and second side wall 1410) and the back wall 1408 of the cement bunker are shown as obstructed or blocked voxels (e.g., voxels having an audio density value greater than a threshold value). FIG. 16 shows a perpendicular (relative to FIG. 15) cross-section view 1600 of the XY plane of computer environment 1400. FIG. 17 shows a perpendicular (relative to FIGS. 15 and 16) cross-section vie 1700 of the YZ plane of computer environment 1400. In FIGS. 15, 16, and 17, the two side walls 1406, 1410 and ceiling 1412 of the bunker are shown as blocked voxels, as well as the floor 1414 of the bunker. In each view, eight vectors are shown projecting from the listener voxel, each passing through a respective neighboring voxel of the listener voxel.

Referring back to FIG. 13, at 1310, method 1300 includes identifying a listener shape matrix. The listener shape matrix may define the acoustic properties surrounding the listener. The listener shape matrix may be calculated from computer environment volumetric data by generating a plurality of vectors originating from the location of the listener, where each vector is oriented in a different direction. Each vector may terminate at an environmental boundary of the computer environment, where the environmental boundary is defined as an element of the computer environment that has an audio density greater than a threshold value (e.g., greater than 0.2 or 0.5), as a boundary of the computer environment itself (e.g., a boundary of the computer environment beyond which no data of the computer environment exists), or an upper limit value. Examples of environmental boundaries may include a wall, a tree, a piece of furniture, another player or user, and so forth. The shape matrix may include the length of each vector and the associated audio density of the environmental boundary that the vector intersects. In some implementations, the intersection ay be based on a single point of intersection, and in some implementations the intersection may be based on a localized average of surfaces around the point of intersection (e.g., to limit the effect of a very localized obstruction).

Accordingly, in one example, identifying the listener shape matrix includes identifying a plurality of voxels surrounding the voxel location of the listener, as indicated at 1312. For example, the voxel location of the listener may comprise a central voxel and each neighboring voxel (in three dimensions) may be identified as the plurality of voxels surrounding the voxel location of the listener. In one example, a three-by-three-by-three cube of voxels may be identified, where the central voxel is the voxel location of the listener. In FIGS. 15, 16, and 17 the neighboring voxels are shown as dotted boxes.

Identifying the shape matrix may further include, for each identified neighboring voxel, determining distance from the voxel location of the listener to an environmental boundary along a vector that passes through that voxel, as indicated at 1314. For example, for a first neighboring voxel, a first vector may be projected that originates at the central voxel and is angled to pass through the first neighboring voxel. The vector may terminate when it inter sects the nearest voxel along the vector having an audio density greater than a threshold value. Additionally, as indicated at 1316, each vector distance may be associated with the density of the voxel at which the vector terminates, in order to generate the shape matrix.

As shown in FIGS. 15-17, a voxel location of a listener (shown by L) may include a plurality of neighboring voxels through which respective vectors are projected. As shown by the cross-section 1500 of FIG. 15, which is taken through the voxel location of the listener along the z-axis, eight vectors project from the listener voxel, and each vector passes through a respective neighboring voxel. Six of the vectors terminate at a wall of the cement bunker, while two of the vectors extend through the opening of the bunker. The two vectors that extend through the opening may terminate at an environmental boundary outside the bunker, or as shown, may terminate at the end of the voxelized representation.

FIG. 17 shows a further cross-section view 1700 of the voxelized representation of computer environment 1400, taken through the listener voxel along the x-axis of the view of the computer environment shown in FIG. 14. As such, the ceiling, floor, and hack wall of the bunker are shown as blocked voxels. Eight vectors are shown projecting from the listener voxel, each passing through a respective neighboring voxel of the listener voxel. Seven of the vectors terminate at the floor, back wall, or ceiling of the bunker, while one vector (vector V7) extends through the opening of the bunker to the edge of the voxelized representation.

FIG. 18 shows a portion of an example shape matrix corresponding to the vectors illustrated in FIG. 17. The length of each vector from the listener to the intersecting environmental boundary (also referred to as the distance) is entered as a first element of each row of the matrix and the density of the intersecting environmental boundary voxel is entered as a second element of each row of the matrix. For example, the first vector of FIG. 17 (V1) is represented by the first row of the matrix. The first vector has a voxel distance of two and the voxel at which the first vector terminates has an audio density of one. Vector seven (V7) extends to the end of voxelized representation without intersecting any voxels having an audio density greater than the threshold. As such, the audio density of vector V7 is represented as zero, indicating a relatively clear path along that vector.

Thus, a listener shape matrix is identified based on a plurality of vectors projecting from the location of the listener, where each vector passes through a different voxel surrounding the location of the listener. In the example illustrated in FIGS. 15-17, 26 voxels surround the listener voxel in three dimensions, and as such a full shape matrix would include 26 rows. It is to be understood that some vectors were not illustrated in FIGS. 15-17, due to the sections illustrated, while other vectors were illustrated in more than one section.

Returning to FIG. 13, at 1318 method 1300 includes selecting a first audio filter based on the first shape matrix. In one example, the data in the shape matrix may be used to generally define a size and/or shape of a space surrounding the location of the listener, such as square/rectangular (e.g., when the listener is in a room), tubular (such as when the listener is in a hallway), or relatively open (such as when the listener is outside), and the first audio filter may be a filter associated with that size and/or shape. In another example, the data from the shape matrix associated with one or more particular vectors may be analyzed to select an audio filter. For example, in the example illustrated in FIGS. 17 and 18, the vector projecting upward from the listener (vector V1) may be assessed to determine if the vector intersects a voxel having a certain audio density (e.g., 0.8 or higher) and if so, it may be determined if the vector intersects the voxel n a certain distance from the listener. If both criteria are met, it may be determined that the listener is indoors due to the presence of a ceiling, and an appropriate audio filter may be selected. Other mechanisms for selecting an appropriate audio filter are possible, such as summing or averaging the distances and/or cities.

The first audio filter may adjust various parameters of sound that is perceived as being output by the sound emitter and received by the listener. For example, the first audio filter may adjust reverb, delay, perceived sound direction, etc., such that the sound that is received by the listener mimics how the sound would be received if the listener were actually in the same audio environment in the real world.

Method 1300 additionally or alternatively includes identifying a sound emitter shape matrix at 1320. The identification of the emitter shape matrix may be performed in addition to or alternative to the identification of the listener shape matrix. When performed in addition, the emitter shape matrix may be identified in parallel to, before, or after the identification of the listener shape matrix.

The sound emitter shape matrix may be identified similarly to the listener shape matrix. As such, identifying the emitter shape matrix may include, at 1322, identifying a plurality of voxels surrounding the voxel location of the emitter, identifying the emitter matrix may further dude, for each identified neighboring voxel, determining a distance from the voxel location of the emitter to an environmental boundary along a vector that passes through that voxel, as indicated at 1324. Additionally, as indicated at 1326, each vector distance may be associated with the density of the voxel at which the vector terminates, in order to generate the shape matrix.

At 1328, method 1300 includes selecting a second audio filter based on the second shape matrix. The second audio filter may be selected in a similar manner as the first audio filter, e.g., based on a shape and/or size of the space in which the sound emitter is located. The second audio filter may adjust various para of sound that is perceived as being output by the sound emitter and received by the listener. For example, the second audio filter may adjust revert), delay, output sound direction, etc., such that the sound that is output by the sound emitter mimics how the sound would be output if the sound emitter were actually in the same audio environment in the real world.

The appropriate audio filter may be selected by a selector module residing on the computing device executing method 1300. In other examples, the computing device may send the shape matrix to an audio engine residing on a separate device (e.g., on a receiver coupled to one or more speakers), and the audio engine may include a selector module to select the appropriate audio filter. In some implementations, the selector module may be trained via machine learning to translate a shape matrix into one of a plurality of different possible generalized shapes. A selector module may be trained to identify virtually any number of different shapes, sizes, or other properties of an environment based on a shape matrix. Further, a selector module may be trained to select virtually any number of audio filters based on an identified shape.

Figure 19:
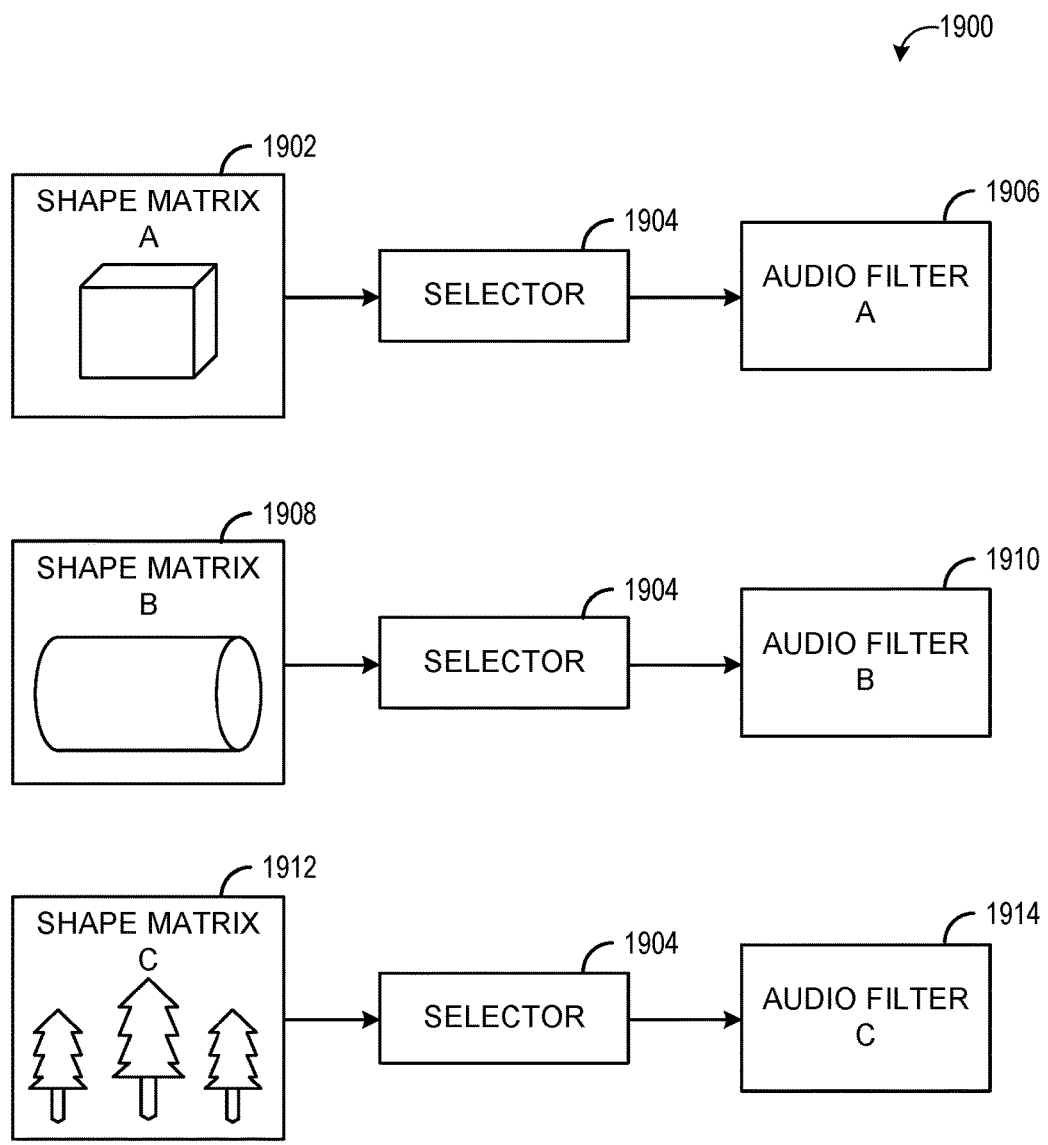
FIG. 19 schematically shows example processes for selecting an audio filter based on a shape matrix.

FIG. 19 schematically shows example processes 1900 for selecting an appropriate audio filter via a selector module 1904. In a first example, a first shape matrix (shape matrix A 1902) may indicate that the shape of the space in which a listener is located is in the shape of a rectangle/cube (e.g., the listener is located in a room). Accordingly, the selector 1904 may select a first audio filter (audio filter A 1906) that is associated with a rectangular listener space.

In a second example, a second shape matrix (shape matrix B 1908) may indicate that the shape of the space in which a listener is located is in the shape of a cylinder/tube (e.g., the listener is located in a hallway). Accordingly, the selector 1904 may select a second audio filter (audio filter B 1910) that is associated with a tubular listener space.

In a third example, a third shape matrix (shape matrix C 1912) may indicate that the space in which a listener is located is a forest (e.g., a wide open space with sound-blocking features dispersed throughout the space). Accordingly, the selector 1904 may select a third audio filter (audio filter C 1914) that is associated with a forest-type environment.

Returning to method 1300, both 1318 and 1328 proceed to 1330, where method 1300 includes outputting sound filtered by the first filter and/or second filter. The sound may be output in the form of a digital or analog signal for downstream processing and/or playback (e.g., via one or more speakers). Method 1300 then returns.

Thus, the method described above with respect to FIG. 13 provides for generating a voxelized representation of a computer environment, where the computer environment is an environment of a video game, virtual reality application, augmented reality application, or other suitable environment. The voxelized representation may be analyzed to determine aspects of the spaces in which the listener and/or sound emitter are located, such as the size and shape of the spaces. Based on the aspects of the spaces, appropriate audio filters may be selected to filter sound that is output as part of the computer environment, in order to produce sound that mimics how sound would be emitted and/or perceived in the real world.

By analyzing the voxelized representation of the computer environment, the computer environment may be dynamically assessed for changes in listener and/or sound emitter location as well as changes to the elements of the computer environment. For example, a shape matrix may be identified for the listener, the sound emitter, and respective audio filters may be selected and applied in order to filter the sound based on the environmental acoustic properties of both the location of the sound emitter and the location of the listener. Then, if the location of the listener changes, an updated shape matrix for the listener may be identified and a new audio filter for the listener may be selected. The sound may then be filtered by the new audio filter and the original sound emitter audio filter, for example.

The methods described herein may be utilized in user-created game environments, or other game environments that have not had 3D sound characteristics and/or routes specifically embedded by the game developer. Further, while the examples described herein relate to a voxelized, three-dimensional representation, it is to be understood similar methods for identifying vector distances and audio density parameters of a virtual space may be applied to two-dimensional representations of the computer environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 20:
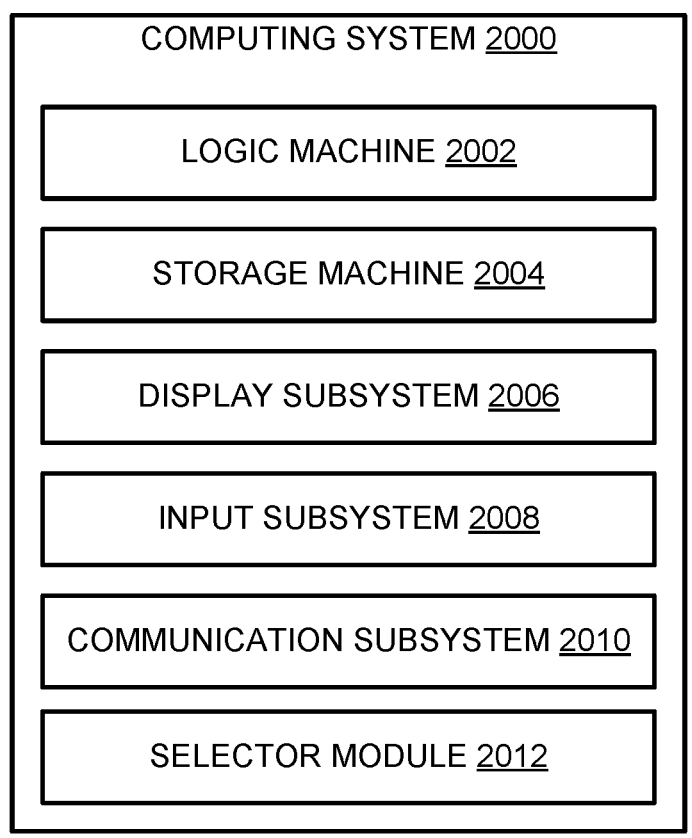
FIG. 20 schematically shows a non-limiting computing system.

FIG. 20 schematically shows a non-limiting embodiment of a computing system 2000 that can enact one or more of the methods and processes described above. Computing system 2000 is shown in simplified form. Computing system 2000 may take the form of one or more personal computers, server computers, tablet computers, home-entertainment computers, network computing devices, gaming devices, mobile computing devices, mobile communication devices (e.g., smart phone), and/or other computing devices. System 100, system 700, computing system 1000, mobile device 1100, and cloud-supported environment 1200 are non-limiting examples of computing system 2000.

Computing system 2000 includes a logic machine 2002 and a storage machine 2004. Computing system 2000 may optionally include a display subsystem 2006, input subsystem 2008, communication subsystem 2010, and/or other components not shown in FIG. 20.

Logic machine 2002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or ore components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 2004 includes one or more physical devices configured to hold instructions executable by the logic machine to implement the methods and processes described herein. When such methods and processes are implemented, the state of storage machine 2004 may be transformed e.g., to hold different data.

Storage machine 2004 may include removable and/or built-in devices. Storage machine 2004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 2004 may include volatile, nonvolatile, dynamic, static, read/write, read-only, random-access, sequential-access, location-addressable, file-addressable, and/or content-addressable devices.

It will be appreciated that storage machine 2004 includes one or more physical devices. However, aspects of the instructions described herein alternatively may be propagated by a communication medium (e.g., an electromagnetic signal, an optical signal, etc.) that is not held by physical device for a finite duration.

Aspects of logic machine 2002 and storage machine 2004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 2000 implemented to perform a particular function. In some cases, a module, program, or engine may be instantiated via logic machine 2002 executing instructions held by storage machine 2004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 2006 may be used to present a visual representation of data held by storage machine 2004. This visual representation may take the form of a graphical user interface (GUI). As the herein described methods and processes change the data held by the storage machine, and thus transform the state of the storage machine, the state of display subsystem 2006 may likewise be transformed to visually represent changes in the underlying data. Display subsystem 2006 may include one or more display devices utilizing virtually any type of technology. Such display devices may be combined with logic machine 2002 and/or storage machine 2004 in a shared enclosure, or such display devices may be peripheral display devices.

When included, input subsystem 2008 may comprise or interface with one or more user input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2010 may be configured to communicatively couple computing system 2000 with one or more other computing devices. Communication subsystem 2010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2000 to send and/or receive messages to and/or from other devices via a network such as the Internet.

Computing system 2000 may further include a selector module 2012. Selector module 2012 may receive environmental audio data of a computer environment, such as a shape matrix of a listener and/or a shape matrix of a sound emitter, as described above. Based on the received shape matrix, the selector module 2012 may select an appropriate audio filter associated with one or aspects of the shape matrix. The selector module 2012 may inform an audio engine (local to computing system 2000 or located remotely) of the selected audio filter, and the audio engine may apply the selected audio filter to sound that is output by one or more speakers.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. By way of example and with reference to FIG. 11 computer readable storage media include memory and storage 1120, 1122, and 1124. By way of example and with reference to FIG. 20, computer-readable storage media include storage machine 2004. The term computer-readable storage media does not include signals and carrier waves. In addition, the term computer-readable storage media does not include communication connections (e.g., 1070, 1160, 1162, and 1164).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure. Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Another example provides a method for processing sound in a computer environment. The method includes recognizing a location of a listener in the computer environment; identifying a shape matrix including, for each of a plurality of vectors intersecting the location of the listener, a distance from the location of the listener to an environmental boundary of the computer environment along the vector; selecting an audio filter based on the shape matrix; and outputting sound filtered by the audio filter. In such an example, selecting an audio filter based on the shape matrix additionally or alternatively includes identifying a shape and/or size of the computer environment based on the shape matrix and selecting a filter associated with the shape and/or size of the computer environment. In such an example, the method may additionally or alternatively include generating a voxelized representation of the computer environment comprising a plurality of voxels, and wherein the location of the listener comprises one or more voxels of the plurality of voxels. In such an example, the method may additionally or alternatively include assigning a sound density value to each voxel of the plurality of voxels based on properties of elements within the computer environment. In such an example, the method may additionally or alternatively include determining, for each of the plurality of vectors, the distance from the location of the listener to the environmental boundary of the computer environment along the vector by determining a distance from the one or more voxels defining the location of the listener to a nearest voxel along the vector that has a sound density value greater than a threshold value. In such an example, the plurality of vectors additionally or alternatively includes twenty-six vectors each originating at the location of the listener and each having a different direction. In such an example, the shape matrix may be a first shape matrix and the audio filter may be a first audio filter, and the method additionally or alternatively includes recognizing a location of a sound emitter in the computer environment; identifying a second shape matrix including, for each of a plurality of vectors intersecting the location of the sound emitter, a distance from the location of the sound emitter to an environmental boundary of the computer environment along the vector; and selecting a second audio filter based on the second shape matrix. In such an example, outputting sound additionally or alternatively includes outputting sound filtered by the first audio filter and the second audio filter. In such an example, the audio filter is additionally or alternatively selected by a selector module trained via machine learning. Any or all of the above-described examples may be combined in any suitable manner in various implementations.

Another example provides a method for processing sound in voxelized computing environment. The method includes recognizing a voxel location of a listener in the voxelized computer environment, identifying a shape matrix including, for each neighboring voxel surrounding the voxel location of the listener, a distance through the neighboring voxel to an environmental boundary of the oxidized computer environment; selecting an audio filter based on the shape matrix; and outputting sound filtered by the audio filter. In such an example, the voxel location of the listener additionally or alternatively includes a central voxel of the voxelized computer environment corresponding to a location of the listener, the central voxel is additionally or alternatively surrounded by twenty-six neighboring voxels, and identifying the shape matrix additionally or alternatively includes determining a respective distance through each of the twenty-six neighboring voxels to a respective nearest voxel that has an audio density value greater than a threshold value. In such an example, identifying the shape matrix further additionally or alternatively includes associating a respective audio density value of each nearest voxel with a respective distance. In such an example, selecting an audio filter based on the shape matrix additionally or alternatively includes determining an overall shape and/or size of a space of the computer environment in the listener is located based on the shape matrix and selecting an audio filter associated with the overall shape and/or size of the space. In such an example, the shape matrix is additionally or alternatively a first shape matrix and the audio filter is additionally or alternatively a first audio filter, and the method additionally or alternatively includes recognizing a location of a sound emitter in the computer environment; identifying a second shape matrix including, for each neighboring voxel surrounding the voxel location of the sound emitter, a distance through the neighboring voxel to an environmental boundary of the voxelized computer environment; and selecting a second audio filter based on the second shape matrix. In such an example, outputting sound additionally or alternatively includes outputting sound filtered by the first audio filter and the second audio filter. In such an example, the audio filter is additionally or alternatively selected by a selector module trained via machine learning. Any or all of the above-described examples may be combined in any suitable manner in various implementations.

Another example provides a computing system for providing directional audio in a voxelized computer environment. The computing system includes a logic machine; and a storage machine holding instructions executable by the logic machine to: recognize a voxel location of a listener in the voxelized computer environment; recognize a voxel location of a sound emitter in the voxelized computer environment: identify a first shape matrix including, for each listener neighboring voxel surrounding the voxel location of the listener, a distance through the listener neighboring voxel to an environmental boundary of the voxelized computer environment; identify a second shape matrix including, for each emitter neighboring voxel surrounding the voxel location of the sound emitter, a distance through the emitter neighboring voxel to an environmental boundary of the voxelized computer environment; select a first audio filter based on the first shape matrix; select a second audio filter based on the second shape matrix; output audio filtered by the first audio filter and the second audio filter. In such an example, the instructions are additionally or alternatively executable to, responsive to the listener moving location: recognize a second voxel location of the listener in the voxelized computer environment; identify a third shape matrix including, for each listener neighboring voxel surrounding the second voxel location of the listener, a distance through the listener neighboring voxel to an environmental boundary of the voxelized computer environment; select a third audio filter based on the third shape matrix; and output audio filtered by the third audio filter and the second audio filter. In such an example, the instructions are additionally or alternatively executable to identify that a given voxel of the voxelized computer environment is an environmental boundary of the computer environment when an audio density value of the given voxel is greater than a threshold value. In such an example, the computing system additionally or alternatively includes a selector module trained via machine learning to select the first audio filter and the second audio filter. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for processing sound in a virtual environment, the method comprising:
   recognizing a listener voxel corresponding to a location of a listener in the virtual environment;
   defining a plurality of direction vectors intersecting the listener voxel and spanning a 3D volume surrounding the listener voxel, each direction vector terminating at a terminal voxel in the virtual environment;
   computing a shape matrix including, for each of the plurality of direction vectors, a first element specifying distance from the listener voxel to the terminal voxel of that direction vector, and a second element specifying a level of sound opacity at the terminal voxel of that direction vector;
   correlating the shape matrix to a model listener environment from among a finite number of model environments of predetermined shape;
   selecting a listener audio filter based on the model listener environment;
   filtering the sound based on the listener audio filter; and outputting the filtered sound.

2. The method of claim 1, wherein selecting the listener audio filter based on the shape matrix comprises identifying a shape and/or size of a portion of the virtual environment surrounding the listener and selecting an audio filter associated with the shape and/or size.

3. The method of claim 1, further comprising generating a voxelized representation of the virtual environment comprising a plurality of voxels.

4. The method of claim 3, further comprising assigning a level of sound opacity to each of the plurality of voxels based on properties of elements within the virtual environment.

5. The method of claim 1 wherein the terminal voxel of at least on direction vector has a level of sound opacity greater than a threshold value.

6. The method of claim 1, wherein the plurality of direction vectors comprises twenty-six vectors, each originating at the listener voxel and each having a different direction.

7. The method of claim 1, wherein the plurality of direction vectors is a first plurality of direction vectors and wherein the shape matrix is a listener shape matrix, the method further comprising:
   recognizing an emitter voxel corresponding to a location of a sound emitter in the virtual environment;
      defining a second plurality of direction vectors, each of the second plurality of direction vectors originating at the emitter voxel, passing through a different emitter-neighbor voxel, and terminating at a terminal voxel in the virtual environment, the second plurality of direction vectors spanning a 3D volume surrounding the emitter voxel;
   computing an emitter shape matrix including, for each of the second plurality of direction vectors, a third element specifying distance from the emitter voxel to the terminal voxel of that direction vector, and a fourth element specifying a level of sound opacity at the terminal voxel of that direction vector;
   correlating the emitter shape matrix to a model emitter environment from among a finite number of model environments of predetermined shape; and
   selecting an emitter audio filter based on the model emitter environment.

8. The method of claim 7, wherein outputting the filtered sound comprises outputting sound filtered by the emitter audio filter and by the listener audio filter.

9. The method of claim 1, wherein the listener audio filter is selected by a selector module trained via machine learning.

10. A method for processing sound in a virtual environment, the method comprising:
    recognizing a listener voxel corresponding to a location of a listener in the virtual environment;
    defining a plurality of sound-agnostic direction vectors, each sound-agnostic direction vector originating at the listener voxel, passing through a different listener-neighbor voxel, and terminating at a terminal voxel in the virtual environment, the plurality of direction vectors spanning a 3D volume surrounding the listener voxel irrespective of sound propagation in the virtual environment;
    computing a shape matrix including, for each of the plurality of sound-agnostic direction vectors, a first element specifying distance from the listener voxel to the terminal voxel of that direction vector, and a second element specifying a level of sound opacity at the terminal voxel;
    selecting a listener audio filter based on the shape matrix;
    filtering the sound based on the listener audio filter and outputting the filtered sound.

11. The method of claim 10, wherein twenty-six neighboring voxels are adjacent to the listener voxel, and wherein the shape matrix includes first and second elements for each of the twenty-six neighboring voxels.

12. The method of claim 10, wherein selecting the listener audio filter based on the shape matrix comprises determining a shape and/or size of a portion of the virtual environment surrounding the listener voxel, and wherein the listener audio filter is selected based on the shape and/or size.

13. The method of claim 10, wherein the plurality of sound-agnostic direction vectors is a first plurality of sound-agnostic direction vectors and wherein the shape matrix is a listener shape matrix, the method further comprising:
    recognizing an emitter voxel corresponding to a location of a sound emitter in the virtual environment;
    defining a second plurality of sound-agnostic direction vectors, each of the second plurality of sound-agnostic direction vectors originating at the emitter voxel, passing through a different emitter-neighbor voxel, and terminating at a terminal voxel in the virtual environment, the second plurality of direction vectors spanning a 3D volume surrounding the emitter voxel, irrespective of sound propagation in the virtual environment;
    computing an emitter shape matrix including, for each of the second plurality of sound-agnostic direction vectors, a third element specifying distance from the emitter voxel to the terminal voxel of that sound-agnostic direction vector, and a second element specifying a level of sound opacity at the terminal voxel at that sound-agnostic direction vector; and
    selecting an emitter audio filter based on the emitter shape matrix.

14. The method of claim 13, wherein outputting the filtered sound comprises outputting sound filtered by the emitter audio filter and by the listener audio filter.

15. The method of claim 10, wherein the listener audio filter is selected by a selector module trained via machine learning.

16. A computing system for providing directional audio in a voxelized virtual environment, the computing system comprising:
    a logic machine; and
    a storage machine holding instructions executable by the logic machine to:
        recognize a listener voxel corresponding to a location of a listener in the virtual environment;
        recognize an emitter voxel corresponding to a location of a sound emitter in the virtual environment;
        define a first plurality of sound-agnostic direction vectors, each of the first plurality of sound-agnostic direction vectors originating at the listener voxel, passing through a different listener-neighbor voxel, and terminating at a terminal voxel in the virtual environment, the first plurality of direction vectors spanning a 3D volume surrounding the listener voxel, irrespective of sound propagation in the virtual environment;
        compute a listener shape matrix including, for each of the first plurality of sound-agnostic direction vectors, a first element specifying distance from the listener voxel to the terminal voxel of that direction vector, and a second element specifying a level of sound opacity at the terminal voxel of that direction vector;
        define a second plurality of sound-agnostic direction vectors, each of the second plurality of sound-agnostic direction vectors originating at the emitter voxel, passing through a different emitter-neighbor voxel, and terminating at a terminal voxel in the virtual environment, the second plurality of direction vectors spanning a 3D volume surrounding the emitter voxel irrespective of sound propagation in the virtual environment;
        compute an emitter shape matrix including, for each of the second plurality of sound-agnostic direction vectors, a third element specifying distance from the emitter voxel to the terminal voxel of that direction vector, and a fourth element specifying a level of sound opacity at the terminal voxel of that direction vector;
        select a listener audio filter based on the listener shape matrix;
        select an emitter audio filter based on the emitter shape matrix; and
        output audio filtered by the by the emitter audio filter and by the listener audio filter.

17. The method of claim 4 wherein one or more of the terminal voxels is located at a boundary of the virtual environment.

18. The method of claim 10 wherein one or more of the terminal voxels has a level of sound opacity greater than a threshold value.

19. The method of claim 10 wherein one or more of the terminal voxels is located at a boundary of the virtual environment.

* * * * *